(12) United States Patent
Poberezhskiy et al.

(10) Patent No.: US 12,704,642 B2
(45) Date of Patent: Aug. 11, 2026

(54) FAST GNSS SIGNAL ACQUISITION FOR A MANEUVERABLE VEHICLE IN LOW-SNR ENVIRONMENT

(71) Applicant: Raytheon Company, Tewksbury, MA (US)

(72) Inventors: Gennady Y. Poberezhskiy, Hermosa Beach, CA (US); Phillip M. Izdebski, Castle Pines, CO (US); Jason Kyle, Tucson, AZ (US)

(73) Assignee: RAYTHEON COMPANY, Tewksbury, MA (US)

( * ) Notice: Subject to any disclaimer, the term of this patent is extended or adjusted under 35 U.S.C. 154(b) by 251 days.

(21) Appl. No.: 18/591,415

(22) Filed: Feb. 29, 2024

(65) Prior Publication Data

US 2025/0277911 A1 Sep. 4, 2025

(51) Int. Cl.
*G01S 19/29* (2010.01)
*G01S 19/37* (2010.01)

(52) U.S. Cl.
CPC .............. *G01S 19/29* (2013.01); *G01S 19/37* (2013.01)

(58) Field of Classification Search
CPC ................................. G01S 19/29; G01S 19/37
USPC ..................................................... 342/357.68
See application file for complete search history.

(56) References Cited

U.S. PATENT DOCUMENTS 6,208,291 B1 3/2001 Krasner
7,061,972 B1 6/2006 Best
7,447,259 B2 11/2008 Betz et al.
11,086,021 B1 * 8/2021 Zangvil .................. G01S 19/22
11,855,683 B2 12/2023 Izdebski et al.
12,493,114 B2 * 12/2025 Lugitsch ............. G01S 13/0209
2002/0015456 A1 2/2002 Norman et al.
2009/0096668 A1 4/2009 Chen
2016/0161613 A1 * 6/2016 Raghupathy ............ G01S 19/31 342/357.61

OTHER PUBLICATIONS

International Search Report with Written Opinion issued in International Application No. PCT/US2024/062096; Date of Mailing Apr. 28, 2025 (17 pages).

(Continued)

*Primary Examiner* — Harry K Liu

(74) *Attorney, Agent, or Firm* — CANTOR COLBURN LLP

(57) ABSTRACT

An electronic device including a device architecture including a tracking engine (TE). The TE includes a plurality of TE channels, each TE channel including a plurality of correlators. In a first mode of the electronic device, the electronic device is configured to: divide the plurality of TE channels into a first group of TE channels and a second group of TE channels; configure the first group of TE channels to search for and detect a plurality of signals in parallel, search for and detect the plurality of signals according to a sequential order, or both; and configure the second group of TE channels to validate and track the detected plurality of signals. In a second mode of the electronic device, the electronic device is configured to configure the first group of TE channels and the second group of TE channels to track the detected plurality of signals.

18 Claims, 11 Drawing Sheets

(56) References Cited

OTHER PUBLICATIONS

O'Mahony et al., "A dual-threshold up-down counter for GPS acquisition" Signal Processing, vol. 91, No. 5, Oct. 21, 2010 (pp. 1093-1102).
Blake, L. V., "A Guide to Basic Pulse-Radar Maximum-Range Calculation, Part 1—Equations, Definitions and Aids to Calculation", NRL Report 6930, 1969, 157 pages.
Kaplan, Elliott, D. et al., "Understanding GPS Principles and Applications", Second Edition, 2006, Artech House, Inc., 723 pages.
Lyusin, Sergey V., et al., "Fast Acquisition by Matched Filter Technique for GPS/GLONASS Receivers", Proc. ION GPS, 1998, pp. 307 315.
McLemore, Brian, et al., "GPS Weak-Signal BOC Code Acquisition", 32nd International Technical Meeting of the Satellite Division of the Institute of Navigation (ION GNSS+ 2019), Miami, FL, Sep. 16-20, 2019, 12 pages.
Seo, Hung Seok, et al., "A New Fast Acquisition Algorithm for GPS Receivers", Proc. 2000 Int. Symp. on GPS/GNSS, Dec. 2000, 5 pages.
Xiaowen, Sun et al., "Fast Acquisition of GPS Signal Using Extended Multiple Correlator based on FPGA", 2010 Internation Conference on Computer Application and System Modeling, 4 pages.

* cited by examiner

Figure 7:
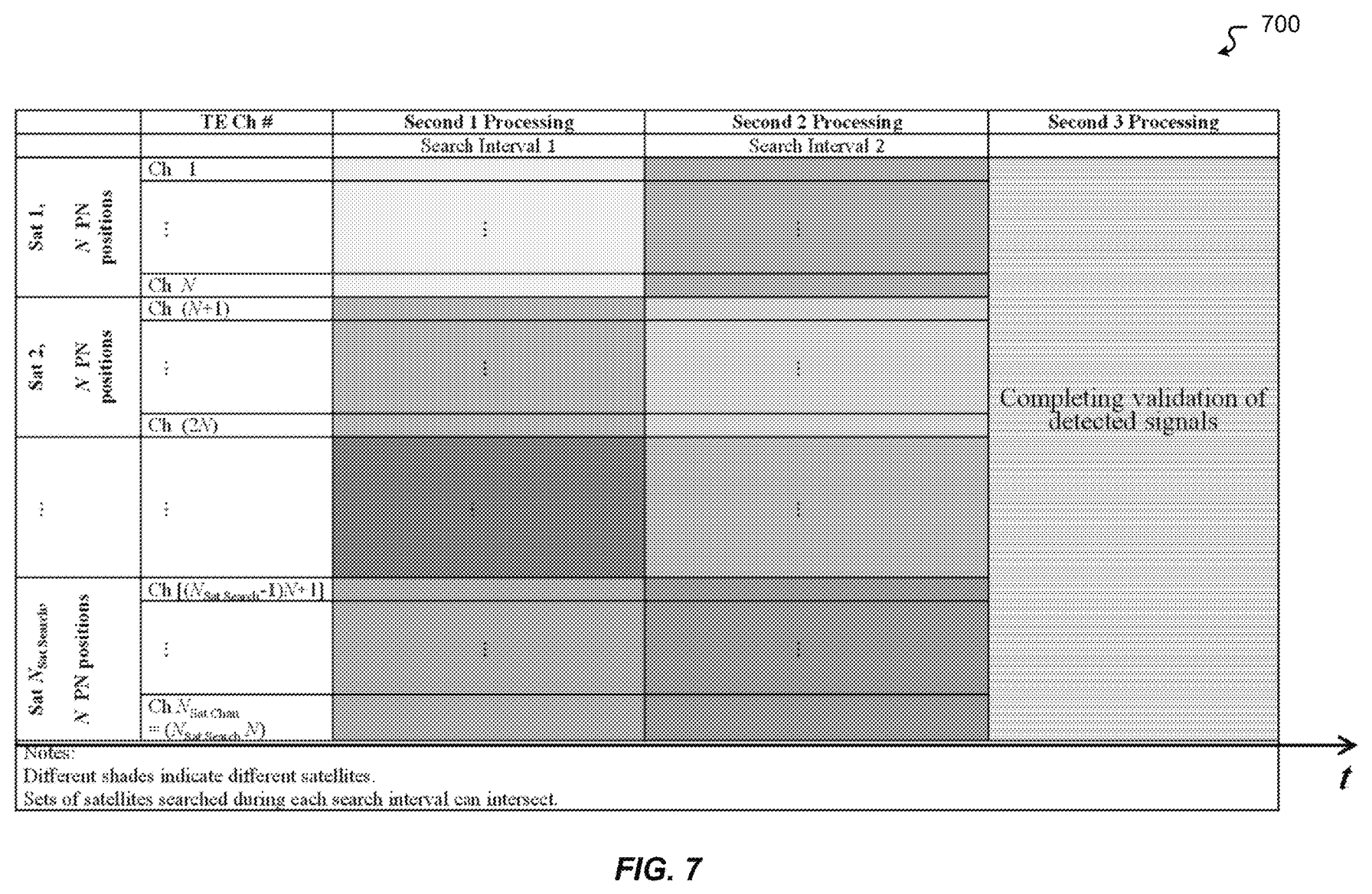

700

| | TE Ch # | Second 1 Processing | Second 2 Processing | Second 3 Processing |
|---|---|---|---|---|
| | | Search Interval 1 | Search Interval 2 | |
| Sat 1, $N$ PN positions | Ch 1 | | | Completing validation of detected signals |
| | ⋮ | ⋮ | ⋮ | |
| | Ch $N$ | | | |
| Sat 2, $N$ PN positions | Ch $(N+1)$ | | | |
| | ⋮ | ⋮ | ⋮ | |
| | Ch $(2N)$ | | | |
| ⋮ | ⋮ | ⋮ | ⋮ | |
| Sat $N_{Sat\ Search}$, $N$ PN positions | Ch $[(N_{Sat\ Search}-1)N+1]$ | | | |
| | ⋮ | ⋮ | ⋮ | |
| | Ch $N_{Sat\ Chan}$ $= (N_{Sat\ Search}\ N)$ | | | |

$t$

Notes:
Different shades indicate different satellites.
Sets of satellites searched during each search interval can intersect.

Figure 8:
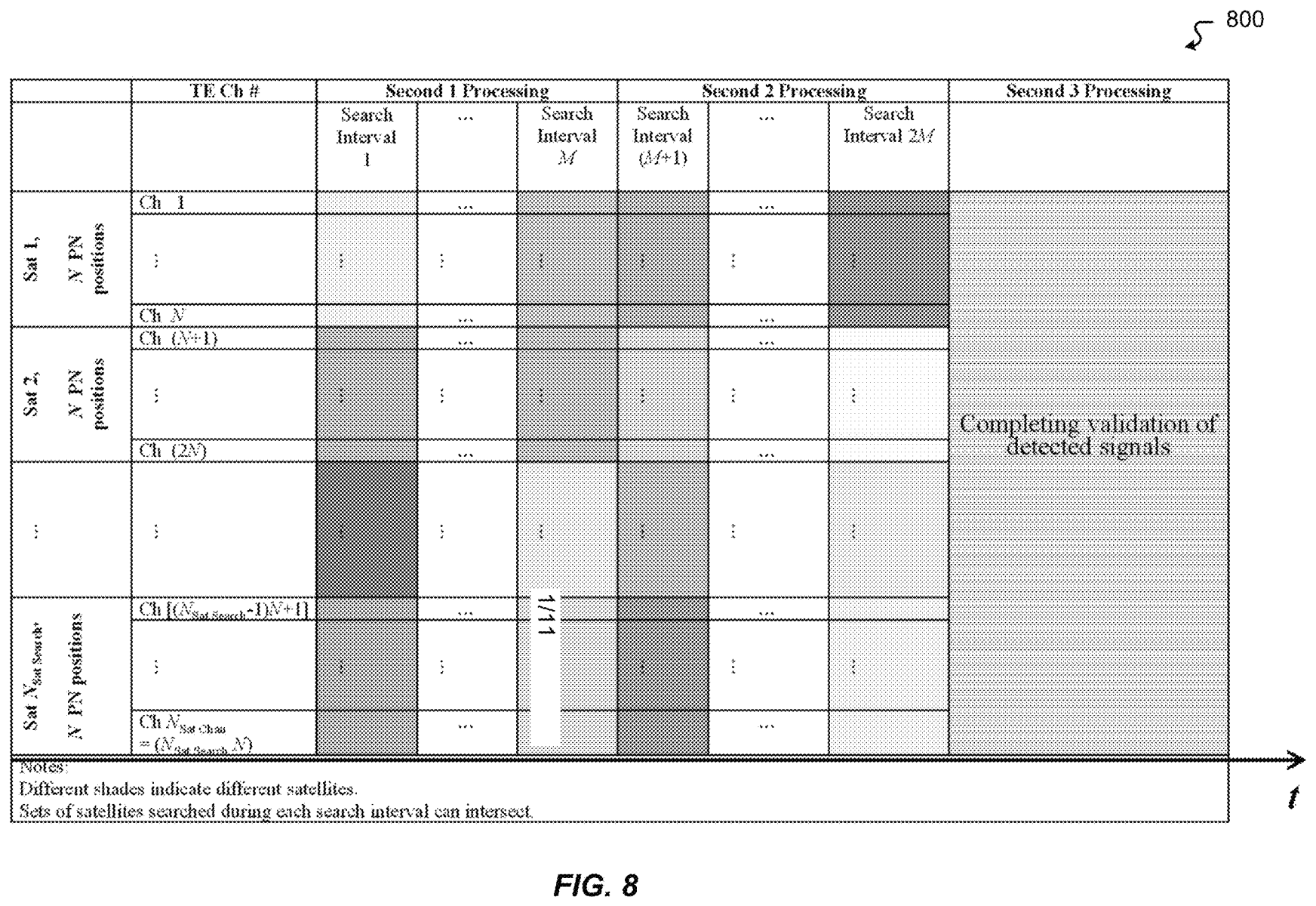

| | TE Ch # | Second 1 Processing | | | Second 2 Processing | | | Second 3 Processing |
|---|---|---|---|---|---|---|---|---|
| | | Search Interval 1 | ... | Search Interval $M$ | Search Interval $(M+1)$ | ... | Search Interval $2M$ | |
| Sat 1, $N$ PN positions | Ch 1 | | ... | | | ... | | Completing validation of detected signals |
| | ⋮ | ⋮ | ⋮ | ⋮ | ⋮ | ⋮ | ⋮ | |
| | Ch $N$ | | ... | | | ... | | |
| Sat 2, $N$ PN positions | Ch $(N+1)$ | | ... | | | ... | | |
| | ⋮ | ⋮ | ⋮ | ⋮ | ⋮ | ⋮ | ⋮ | |
| | Ch $(2N)$ | | ... | | | ... | | |
| ⋮ | ⋮ | ⋮ | ⋮ | ⋮ | ⋮ | ⋮ | ⋮ | |
| Sat $N_{Sat Search}$, $N$ PN positions | Ch $[(N_{Sat Search}-1)N+1]$ | | ... | | | ... | | |
| | ⋮ | ⋮ | ⋮ | ⋮ | ⋮ | ⋮ | ⋮ | |
| | Ch $N_{Sat Chan} = (N_{Sat Search} \cdot N)$ | | ... | | | ... | | |

Notes:
Different shades indicate different satellites.
Sets of satellites searched during each search interval can intersect.

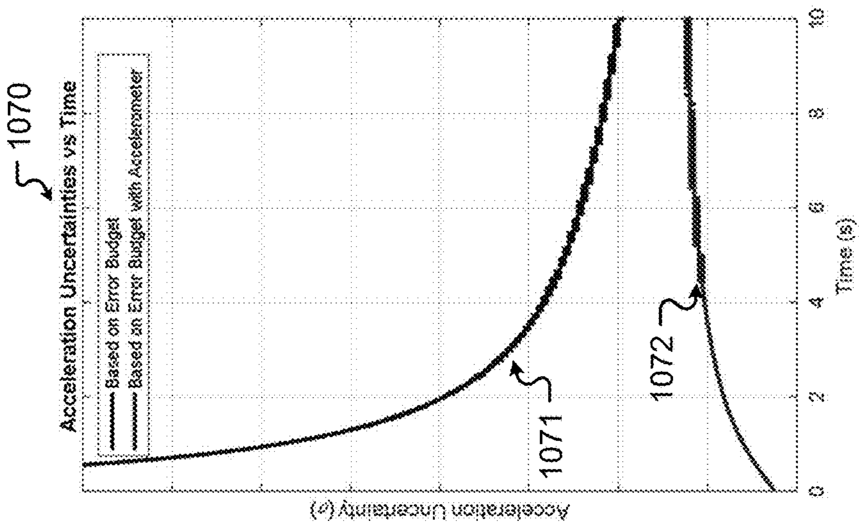
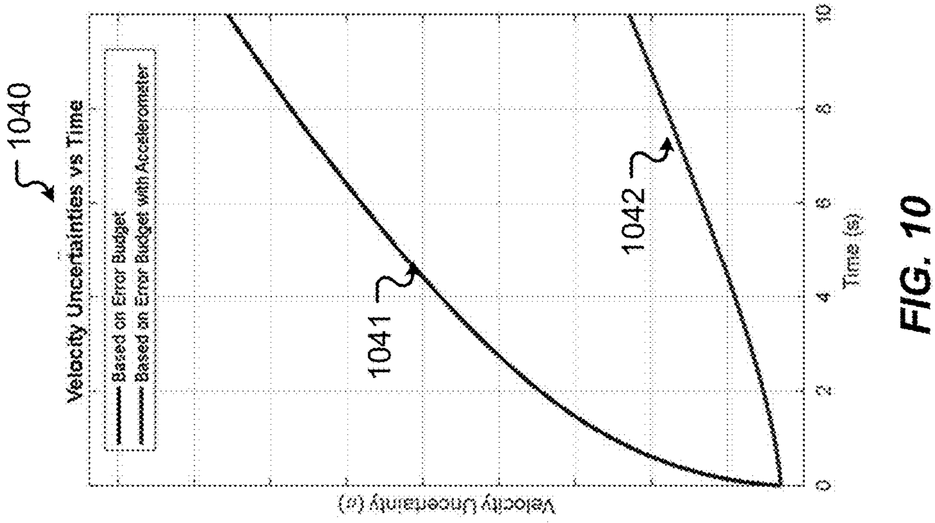
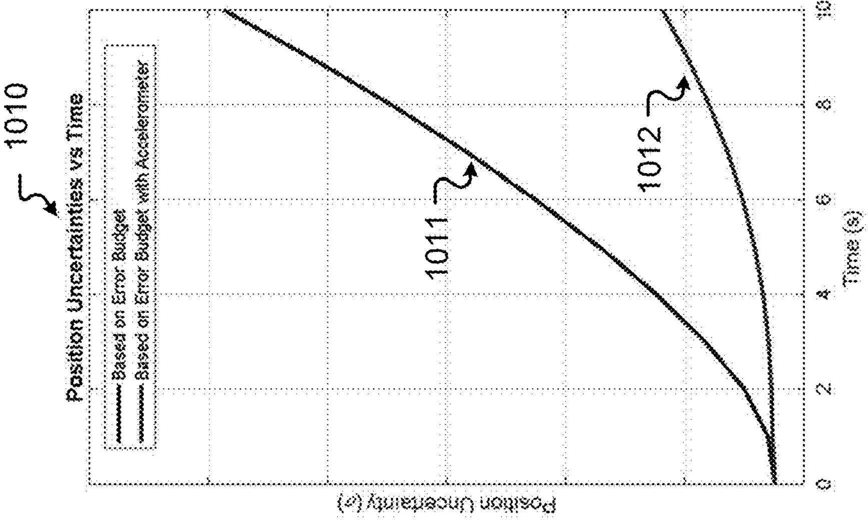
*FIG. 10*

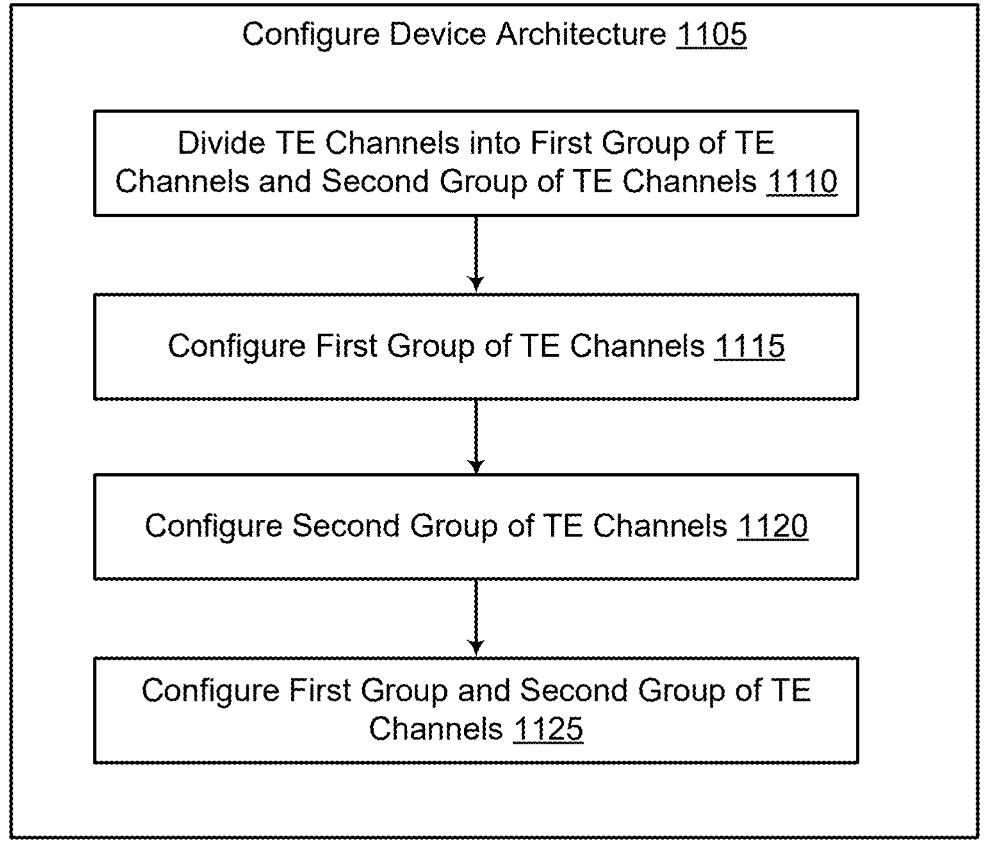
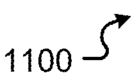
*FIG. 11*

FAST GNSS SIGNAL ACQUISITION FOR A MANEUVERABLE VEHICLE IN LOW-SNR ENVIRONMENT

STATEMENT OF FEDERAL SUPPORT

This invention was made with Government support under contract DOTC-19-05-INIT5501 awarded by the U.S. Army, Department of Defense. The Government has certain rights in the invention.

FIELD

The present disclosure relates generally to electronic devices that may function as direct sequence (DS) spread spectrum (SS) receivers and, more particularly, to reconfigurable electronic devices that may function as Global Navigation Satellite System (GNSS) and Regional Navigation Satellite System (RNSS) receivers.

BACKGROUND

In some signal acquisition techniques, acquisition of a GNSS satellite signal at a receiver may include producing an estimate of the position of the GNSS satellite signal on the time-frequency plane of the receiver with a specified accuracy. In an example case of initial acquisition (e.g., if the receiver has not been tracking GNSS signals for some time), the receiver may be aware of its own position, dynamics, clock bias, and clock drift, but with uncertainties associated with the position, dynamics, clock bias, and clock drift.

In some cases, such uncertainties associated with initial acquisition may increase the complexity and time associated with completing the signal search and acquisition process, especially, for example, for long-code signals (e.g., long-code GNSS signals). In some cases, in addition to uncertainties associated with initial acquisition, complexity and time associated with completing the signal search and acquisition process may further be increased due to fast dynamics of the platform, as well as low carrier-to-noise ratio ($C/N_0$) due to interference and/or low-cost analog and mixed-signal components. Techniques for achieving faster initial acquisition in support of GNSS applications in such challenging conditions are desired.

BRIEF DESCRIPTION

According to an aspect of the disclosure an electronic device is provided including: a device architecture including a tracking engine (TE), where the TE includes a plurality of TE channels, each TE channel including a plurality of correlators. In a first mode of the electronic device, the electronic device is configured to: divide the plurality of TE channels into a first group of TE channels and a second group of TE channels; configure the first group of TE channels to search for and detect a plurality of signals in parallel, search for and detect the plurality of signals according to a sequential order, or both; and configure the second group of TE channels to validate and track the detected plurality of signals. In a second mode of the electronic device, the electronic device is configured to configure the first group of TE channels and the second group of TE channels to track the detected plurality of signals, where the electronic device is configured to receive direct sequence (DS) spread spectrum (SS) signals.

In any one or combination of the embodiments disclosed herein, the electronic device further includes a plurality of post-correlation acquisition channels, where each post-correlation acquisition channel includes: one or more coherent integration memory blocks; one or more windowed FFT blocks; one or more magnitude estimation blocks; and one or more non-coherent accumulator blocks; and one or more peak detection blocks, each connected to outputs of one or more post-correlation acquisition channels of the plurality of the post-correlation acquisition channels and coupled to a comparator configured to compare a detected peak value to a detection threshold.

In any one or combination of the embodiments disclosed herein, the electronic device further includes a plurality of post-correlation acquisition channels, where in the first mode of the electronic device: the electronic device is configured to couple the plurality of post-correlation acquisition channels to the first group of TE channels; and the plurality of post-correlation acquisition channels are configured to perform frequency analysis of output signals generated by a plurality of correlators in the first group of TE channels.

In any one or combination of the embodiments disclosed herein, the electronic device further includes a peak detection circuit including a plurality of peak detection blocks, where in the first mode of the electronic device: the electronic device is configured to couple the plurality of peak detection blocks to the plurality of post-correlation acquisition channels; and the plurality of peak detection blocks are configured to detect peaks of output signals generated by one or more post-correlation acquisition channels of the plurality of post-correlation acquisition channels, where each peak detector block is coupled to a comparator configured to compare peak value detected by the peak detector block with a detection threshold.

In any one or combination of the embodiments disclosed herein, where in the second mode, the electronic device is configured to: deactivate the plurality of post-correlation acquisition channels; or configure the plurality of post-correlation acquisition channels for one or more functions different from performing the frequency analysis.

Any one or combination of the embodiments disclosed herein, where the electronic device is configured to: determine one or more time-domain uncertainties, one or more frequency-domain uncertainties, or both associated with at least one of: clock bias associated with the electronic device; clock drift associated with the electronic device; position of the electronic device; velocity associated with the electronic device; and acceleration associated with the electronic device; and configure, based on the one or more time-domain uncertainties, the one or more frequency-domain uncertainties, or both, at least one of: one or more time intervals associated with searching for and acquiring the plurality of signals; one or more frequency ranges associated with searching for and acquiring the plurality of signals; and a quantity of different signals to search for in parallel from among the plurality of signals.

Any one or combination of the embodiments disclosed herein, where in the first mode, the electronic device is configured to: determine a set of uncertainties associated with searching for and acquiring the plurality of signals, where the set of uncertainties includes: position uncertainty associated with the electronic device; velocity uncertainty associated with the electronic device; and acceleration uncertainty associated with the electronic device; and maintain or update at least one uncertainty of the set of uncertainties based on processing the set of uncertainties using one or more equations.

Any one or combination of the embodiments disclosed herein, where in the first mode: a quantity of TE channels in the first group of TE channels is variable; and the electronic device is configured to select the quantity based on a set of criteria (e.g., target criteria, target requirements) including input carrier-to-noise ratio and a maximum target time to first fix (TTFF) value.

In any one or combination of the embodiments disclosed herein, the electronic device further includes: one or more inertial measurement devices configured to provide inertial measurement data associated with the electronic device, where, in the first mode, the electronic device is configured to maintain or update at least one uncertainty of the set of uncertainties based on processing the inertial measurement data.

Any one or combination of the embodiments disclosed herein, where each TE channel includes a double-threshold sequential detector including a confirmation threshold and a dismissal threshold.

Any one or combination of the embodiments disclosed herein, where in the first mode, the electronic device is configured to: set detection thresholds in post-correlation acquisition channels coupled to at least some TE channels of the first group of TE channels based on a target probability of detection; and set dismissal thresholds in at least some TE channels of the second group of TE channels based on a target probability of false detection.

Any one or combination of the embodiments disclosed herein, where: in the first mode, the electronic device is configured to assign a subgroup of TE channels in the second group of TE channels for validation of one detected signal, with a plurality of Doppler drift aiding values, where the plurality of Doppler drift aiding values differ from one another and cover (e.g., correspond to) the Doppler drift uncertainty interval.

Any one or combination of the embodiments disclosed herein, where in the first mode, the electronic device is configured to set a search time, one or more detection thresholds, and a quantity of searches using: a short integration approach for cases in which the total frequency drift uncertainty exceeds a threshold uncertainty value, or a long integration approach for cases in which the total frequency drift uncertainty is less than or equal to the threshold uncertainty value.

Any one or combination of the embodiments disclosed herein, where the detected plurality of signals include one or more Global Navigation Satellite System (GNSS) signals, one or more Regional Navigation Satellite System (RNSS) signals, or both.

A method is disclosed including: configuring, by processing circuitry of an electronic device, a device architecture of the electronic device, where configuring the device architecture includes: in association with a first mode of the electronic device: dividing a plurality of TE channels included in a tracking engine (TE) of the device architecture into a first group of TE channels and a second group of TE channels; configuring the first group of TE channels to search for and detect a plurality of signals in parallel, search for and detect the plurality of signals according to a sequential order, or both; and configuring the second group of TE channels to validate and track the detected plurality of signals; and in association with a second mode of the electronic device: configuring the first group of TE channels and the second group of TE channels to track the detected plurality of signals.

Any one or combination of the embodiments disclosed herein, where configuring the device architecture further includes, by the processing circuitry: in the first mode of the electronic device: coupling a plurality of post-correlation acquisition channels of the electronic device to the first group of TE channels; and configuring the plurality of post-correlation acquisition channels to perform frequency analysis of output signals generated by a plurality of correlators in the first group of TE channels.

Any one or combination of the embodiments disclosed herein, where configuring the device architecture further includes, by the processing circuitry: in the first mode of the electronic device: coupling a plurality of peak detection blocks included in a peak detection circuit of the electronic device to the plurality of post-correlation acquisition channels; and configuring the plurality of peak detection blocks to detect peaks of output signals generated by one or more post-correlation acquisition channels of the plurality of post-correlation acquisition channels, where configuring the plurality of peak detection blocks includes coupling each peak detector block to a comparator configured to compare peak value detected by the peak detector block with a detection threshold.

Any one or combination of the embodiments disclosed herein, where configuring the device architecture further includes, by the processing circuitry: in the second mode of the electronic device: deactivating the plurality of post-correlation acquisition channels; or configuring the plurality of post-correlation acquisition channels for one or more functions different from performing the frequency analysis.

Any one or combination of the embodiments disclosed herein, where configuring the device architecture further includes, by the processing circuitry: determining one or more time-domain uncertainties, one or more frequency-domain uncertainties, or both associated with at least one of: clock bias associated with the electronic device; clock drift associated with the electronic device; position of the electronic device; velocity associated with the electronic device; and acceleration associated with the electronic device; and configuring, based on the one or more time-domain uncertainties, the one or more frequency-domain uncertainties, or both, at least one of: one or more time intervals associated with searching for and acquiring the plurality of signals; one or more frequency ranges associated with searching for and acquiring the plurality of signals; and a quantity of different signals to search for in parallel from among the plurality of signals.

Any one or combination of the embodiments disclosed herein, where configuring the device architecture further includes, by the processing circuitry: in the first mode of the electronic device: determining a set of uncertainties associated with searching for and acquiring the plurality of signals, where the set of uncertainties includes: position uncertainty associated with the electronic device; velocity uncertainty associated with the electronic device; and acceleration uncertainty associated with the electronic device; and maintaining or updating at least one uncertainty of the set of uncertainties based on processing the set of uncertainties using one or more equations.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description of the drawings, taken in connection with the accompanying drawings and detailed description, wherein like reference numerals represent like parts.

FIG. 7 illustrates an example timing diagram of a parallel search using a long integration approach in accordance with one or more embodiments of the present disclosure.

FIG. 8 illustrates an example timing diagram of a parallel search using a short integration approach in accordance with one or more embodiments of the present disclosure.

FIG. 10 illustrates example plots of results of uncertainty propagation for position, velocity, and acceleration with respect to time for example use cases in accordance with one or more embodiments of the present disclosure.

FIG. 11 illustrates an example flowchart of a method in accordance with one or more embodiments of the present disclosure.

DETAILED DESCRIPTION

A detailed description of one or more embodiments of the disclosed apparatus and method are presented herein by way of exemplification and not limitation with reference to the Figures. As described herein, the term "noise" is assumed to include external interference from one or more sources in addition to actual receiver noise.

Some solutions for fast acquisition problems (especially, for example, for long-code signals) may include implementing a dedicated acquisition engine (AE) that searches and acquires one GNSS satellite signal at a time. Some AE designs may utilize relatively large numbers of simplified correlators and fast Fourier transform (FFT) blocks to perform a quick search of multiple time-frequency cells over target time-frequency regions. In some cases, the dimensions of a time-frequency cell (e.g., both the time bin and the frequency bin) are determined by the target accuracy specifications. Some approaches may include passing an acquired signal to a Tracking Engine (TE), designed for parallel tracking of signals from multiple satellites with lower implementation losses, for validation and tracking.

Despite differences among some other AE designs, the AE designs may be dependent on one or more of the following assumptions: acceleration uncertainty (and therefore Doppler drift) is not very high; carrier-to-noise ratio C/No is not very low; dominant uncertainties include receiver clock bias and drift (i.e., one-dimensional (1-D) time and frequency errors), so that acquiring even one satellite signal may significantly reduce one or more of the uncertainties. The term "acquiring a satellite" as used herein may refer to acquiring a signal associated with the satellite. It is to be understood that references to a value (e.g., uncertainty, C/No, and the like) described herein as being 'high' or 'low' may refer to a relativity of the value to a corresponding threshold value or threshold value range.

Figure 1:
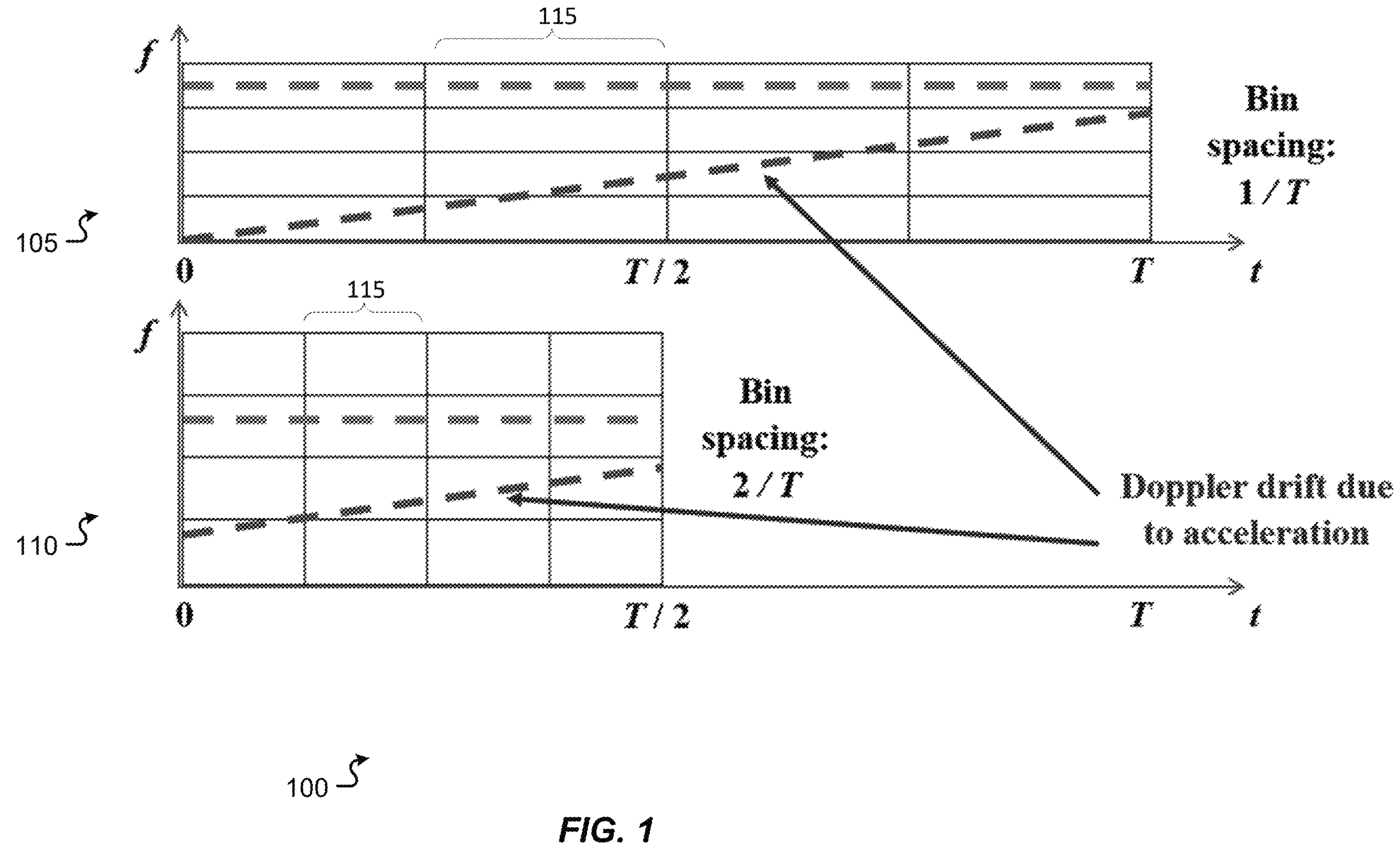
FIG. 1 illustrates example relationships among coherent integration time T, fast Fourier Transform (FFT) bin width, and Doppler drift.

FIG. 1 illustrates example relationships among coherent integration time, FFT bin width, and Doppler drift. Examples 105 and 110 of these relationships and various problems caused by violation of the assumptions described herein are described with reference to FIG. 1.

For example, if acceleration uncertainty is high, the unaccounted (and therefore uncompensated) Doppler drift may move the signal over several frequency bins 115 during the search for and attempted acquisition of the signal, reducing the signal-to-noise ratio (SNR) in each bin 115 and increasing the frequency error. In another example, if C/No is low, the AE implementation loss may complicate and prolong the signal search and acquisition. In another example, if three-dimensional (3D) position and dynamic uncertainties are large, acquiring one satellite may not significantly reduce the 3D position and dynamic uncertainties enough to support effective signal search, acquisition, and validation. For example, in some cases, reducing the 3D position and dynamic uncertainties may be achieved by acquiring at least four satellites, which may complicate and prolong signal search.

The problems described herein are mutually aggravating, i.e., they may impact one another. In an example, an increased signal search duration resulting from the problems of a low C/No and/or relatively high 3D position and dynamic uncertainties may exacerbate the problem of acceleration uncertainty. In some cases, such problems may be especially pronounced for cases in which only coherent integration with constant FFT length is used, as illustrated by FIG. 1. FFT length may correspond to FFT bin width of each frequency bin 115.

The systems and techniques described herein support achieving a faster initial acquisition (e.g., within a few seconds) in support of GNSS applications.

According to one or more embodiments of the present disclosure, a GNSS receiver is provided. The GNSS receiver includes a tracking engine (TE). The tracking engine includes a plurality of satellite channels (also referred to herein as TE satellite channels or TE channels). Each TE channel is designed for validating and tracking a single satellite signal. It includes, among other blocks, a number of correlators and a satellite PN code generator, which can also be used for satellite signal acquisition.

In an acquisition mode, the plurality of TE channels may be divided into two groups, in which the first group of TE channels (also referred to herein as "acquisition group") is configured to search for several GNSS satellite signals at the same time, and the second group of TE channels (also referred to herein as "tracking group") is configured to validate and track the acquired GNSS satellite signals. In some embodiments, the two groups may be unequal, with the larger group configured to search for several GNSS satellite signals at the same time, and the smaller group configured to validate and track the acquired GNSS satellite signals.

According to one or more embodiments of the present disclosure, the GNSS receiver may include a plurality of post-correlation acquisition channels. In some embodiments, each of the post-correlation acquisition channels may include pre-FFT coherent integration (CI) memory blocks, windowed FFT blocks, magnitude estimation blocks, and non-coherent accumulator blocks performing non-coherent integration (NCI), i.e. summation of the outputs of the magnitude estimation blocks accumulator blocks. Non-coherent accumulator blocks are also referred to herein as NCI accumulator blocks. In some embodiments, the GNSS receiver may include one or more peak detection blocks and one or more threshold blocks. For example, the GNSS receiver may include a plurality of peak detection blocks followed by threshold blocks.

In an acquisition mode, the post-correlation acquisition channels are connected to the outputs of the tracking engine TE channels, which are configured to search for several GNSS satellite signals at the same time. In an example, the post-correlation acquisition channels may perform frequency analysis of the correlator outputs. The peak detection blocks are connected to the outputs of the post-correlation acquisition channels. In an example, each of the post-correlation acquisition channels may be assigned to searching for a single satellite signal.

In a non-acquisition mode, the post-correlation acquisition channels and peak detection blocks are deactivated. In an example embodiment, the post-correlation acquisition channels and components included therein are implemented in one or more portions of a processor (e.g., a microprocessor) or an FPGA. In a non-acquisition mode, the GNSS receiver may configure the same one or more portions (which were used for performing frequency analysis in the acquisition mode) for other purposes.

In an embodiment, the GNSS receiver utilizes an acquisition algorithm that uses short search intervals to minimize the losses caused by high frequency drift uncertainties. In implementing the acquisition algorithm, the GNSS receiver may perform a large number of parallel and sequential searches of different satellite signals to acquire signals from multiple satellites (e.g., four satellites).

In an embodiment, in the acquisition mode, the GNSS receiver may utilize the state error uncertainties propagated in time from the initial values using the platform's stochastic equations of motion with the purpose of minimizing the state error uncertainties for the duration of acquisition mode. In an example, the error states may include position, velocity, attitude, clock bias, and clock drift.

In an embodiment, during acquisition, the GNSS receiver may utilize individual or groups of inertial sensors and unconstrained or constrained stochastic equations of motion. For example, the GNSS receiver may utilize an Inertial Measurement Unit (IMU) including groups of inertial sensors such as, for example, three orthogonal accelerometers and three orthogonal gyroscopes. Any individual inertial sensor or groups of inertial sensors are also referred to herein as an inertial measurement device. The GNSS receiver may utilize an inertial measurement device to precompute the propagation of the initial uncertainties, which may reduce dynamic uncertainties and shorten the acquisition time. In some other embodiments, the GNSS receiver may precompute the propagation of the initial uncertainties without using an inertial measurement device.

In an embodiment, the GNSS receiver includes a high-stability and/or shock-resistant local oscillator (LO). In an example, using the local oscillator may support reducing or eliminating time uncertainty (also referred to herein as clock bias) and time drift (also referred to herein as clock drift) at the GNSS receiver. In some aspects, by reducing or eliminating time uncertainty and time drift, the systems and techniques described herein may successfully acquire and validate a GNSS satellite signal with a decreased number of TE channels and post-correlation acquisition channels According to one or more embodiments of the present disclosure, systems and techniques are described herein that support improved utilization of TE channel correlators for acquisition in some scenarios. In some aspects, use of TE channels correlators in accordance with example aspects of the present disclosure may solve or mitigate one or more of the problems outlined herein, as TE channels are capable of supporting parallel acquisition of signals from several satellites and have lower implementation losses compared to other approaches (e.g., such as a separate AE). Additionally, in some aspects, TE correlators are capable of supporting longer coherent integration times. The systems and techniques described herein provide a flexible acquisition architecture that may temporarily combine TE channels with post-correlation acquisition channels for more effective acquisition (e.g., reduced acquisition time, increased accuracy, and the like).

Figure 2:
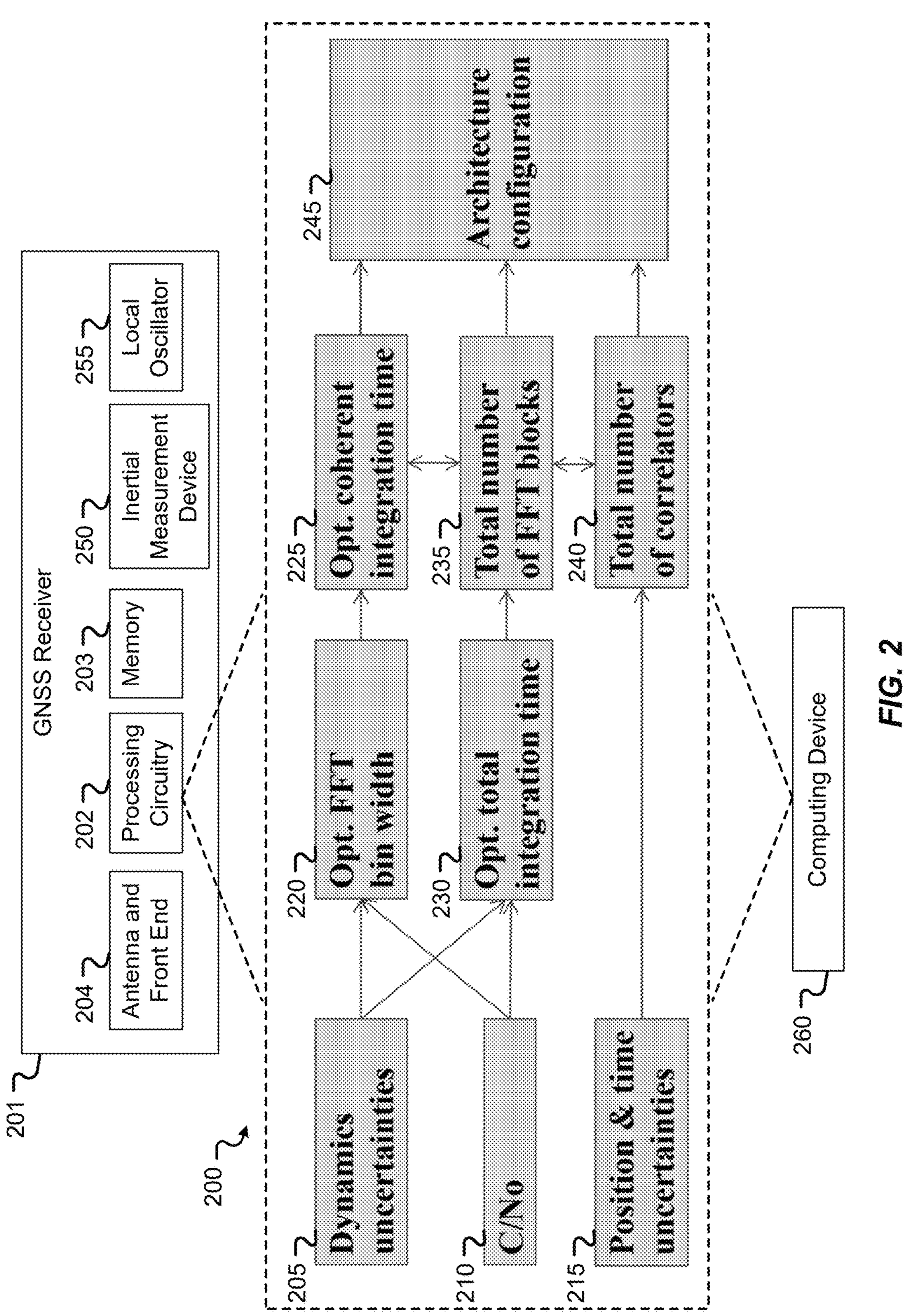
FIG. 2 illustrates an example optimization flow for optimizing an FFT-based acquisition architecture in accordance with one or more embodiments of the present disclosure.

FIG. 2 illustrates an example optimization flow 200 for selecting the acquisition architecture parameters in accordance with one or more embodiments of the present disclosure. Aspects of the optimization flow 200 may be used at the design stage for pre-configured acquisition architecture. For example, aspects of the optimization flow 200 may be performed by a computing device 260.

Additionally or alternatively, aspects of the optimization flow 200 may be implemented by an electronic device (e.g., GNSS receiver 201) in real time to provide flexibility in configuring the acquisition architecture. For example, aspects of the optimization flow 200 may be implemented by a computing device implemented in the GNSS receiver 201. In an example, the optimization flow 200 may be implemented by processing circuitry 202 and executed instructions stored in a memory 203 of the GNSS receiver 201. The GNSS receiver 201 may also include an antenna and front end 204.

The GNSS receiver 201 may include inertial measurement device 250 (e.g., orthogonal accelerometers, orthogonal gyroscopes, groups of orthogonal accelerometers and/or orthogonal gyroscopes, and the like). According to one or more embodiments of the present disclosure, the GNSS receiver 201 may set, maintain, or update at least one of the uncertainties described herein (e.g., dynamic uncertainties 205, uncertainties 215) based on processing measurement data provided by the inertial measurement device 250. In an example, the GNSS receiver 201 and inertial measurement device 250 may be included in a vehicle, and the GNSS receiver 201 may set, maintain, or update at least one of the uncertainties described herein based on processing measurement data provided by the inertial measurement device 250 and constraining the propagation in accordance with known behavior and/or known dynamics of the vehicle. In some examples, the GNSS receiver 201 may determine the behavior and/or dynamics of the vehicle based on corresponding measurements provided by the inertial measurement device 250.

The GNSS receiver 201 may include a local oscillator 255 High stability of the local oscillator 255 may reduce clock bias and clock drift (e.g., minimize time uncertainty and time drift) at the GNSS receiver 201, and in some embodiments, based on the reduced clock bias and/or reduced clock drift, the GNSS receiver 201 may decrease the quantity 240 of correlators and, correspondingly, FFT blocks required for acquisition. For example, due to the reduced clock bias and clock drift, the GNSS receiver 201 may effectively search for and acquire satellite signals while utilizing a reduced number of tracking engine correlators and FFT blocks. Accordingly, for example, the GNSS receiver 201 may set, maintain, or update the quantity 235 of FFT blocks and/or the quantity 240 of correlators for the acquisition architecture, based on the totality of time and frequency uncertainties (including the clock bias and clock drift uncertainties). Additionally, or alternatively, the computing device 260 may set the quantity 235 of FFT blocks and/or the total quantity 240 of correlators for the acquisition architecture of the GNSS receiver 201, based on the totality of time and frequency uncertainties (including the clock bias and clock drift uncertainties). The required quantity 240 of correlators determines the number of TE channels that should be assigned to acquisition.

The processing circuitry 202 described herein (and other processing circuitry or the like described herein) may be implemented by one or many computer processing devices. For example, the processing circuitry 202 may include a silicon chip, such as a Field Programmable Gate Array (FPGA), an Application-Specific Integrated Circuit (ASIC), any other type of Integrated Circuit (IC) chip, a collection of IC chips, or the like. In some aspects, the processing circuitry 202 may include or be included in a microprocessor, a Central Processing Unit (CPU), a Graphics Processing Unit (GPU), or plurality of microprocessors configured to execute the instructions sets stored in a corresponding memory (e.g., memory 203). For example, upon executing the instruction sets stored in memory 203, the processing circuitry 202 may enable or perform one or more functions of the GNSS receiver 201. Additionally, or alternatively, aspects of the optimization flow 200 may be implemented by a computing device different from the GNSS receiver 201.

In some embodiments, the optimization flow 200 includes determining the selection of the integration times and frequency coverage parameters based on the minimum expected C/No 210 as well as maximum expected dynamics.

For example, the optimization flow 200 may include configuring and/or updating FFT bin width 220 based on dynamic uncertainties 205 and C/No 210. The optimization flow 200 may include configuring and/or updating the integration time 230 (e.g., temporal duration) based on dynamic uncertainties 205 and/or C/No 210. In an example, dynamic uncertainties 205 may include velocity and acceleration uncertainties, but are not limited thereto.

The optimization flow 200 may include configuring and/or updating a quantity 240 of correlators (and therefore TE channels) in the first group based on uncertainties 215. In an example, uncertainties 215 may include position uncertainties and time uncertainties, but is not limited thereto.

The optimization flow 200 may include configuring and/or updating coherent integration time 225 (e.g., a temporal duration for coherent integration) based on FFT bin width 220. Additionally, or alternatively, the optimization flow 200 may include configuring and/or updating coherent integration time 225 based on the quantity 235 of FFT blocks.

The optimization flow 200 may include configuring and/or updating the quantity 235 of FFT blocks based on integration time 230. The integration time 230 may be a temporal duration configured for coherent integration and non-coherent integration. Additionally, or alternatively, the optimization flow 200 may include configuring and/or updating the quantity 235 of FFT blocks in the post-correlation acquisition channels based on the quantity 240 of correlators in the first group of TE channels.

The optimization flow 200 may include setting the architecture configuration 245 of the flexible acquisition architecture of the GNSS receiver 201 based on coherent integration time 225, the quantity 235 of FFT blocks, and the quantity 240 of correlators in the first group of TE channels. Accordingly, for example, the optimization flow 200 supports setting the architecture configuration 245 based on dynamic uncertainties 205, C/No 210, and/or uncertainties 215.

As described herein with reference to optimization flow 200, the systems and techniques support selecting specific parameters of the flexible acquisition architecture of the GNSS receiver 201 based on the example variables and parameters described herein. For example, based on the maximum acceleration (e.g., included in dynamic uncertainties 205) and clock drift, the systems and techniques include determining the maximum frequency drift during integration. Based on the maximum frequency drift, the systems and techniques include determining the width and spacing of the FFT bins.

The width and spacing of the FFT bins as determined ensure a sufficient probability that a signal being acquired and verified by GNSS receiver 201 remains mostly in the same frequency bin over the whole integration time. For example, the width and spacing of the FFT bins as determined ensure a high probability that the signal remains in the same frequency bin or at most partially overlaps (e.g., by no more than a threshold amount) with an adjacent frequency bin.

The techniques described herein may prevent or mitigate instances in which the signal energy of a signal being acquired and verified ends up divided among several frequency bins, which may reduce or eliminate a reliance on performing frequency-domain decimation, and which may thereby mitigate or prevent non-coherent integration loss. For example, in some other approaches, the signal energy of the signal being acquired and verified may end up divided among several frequency bins. Accordingly, for example, such other approaches may involve performing frequency-domain decimation to address the division of the signal energy among frequency bins, which may thereby incur non-coherent integration loss.

Figure 3:
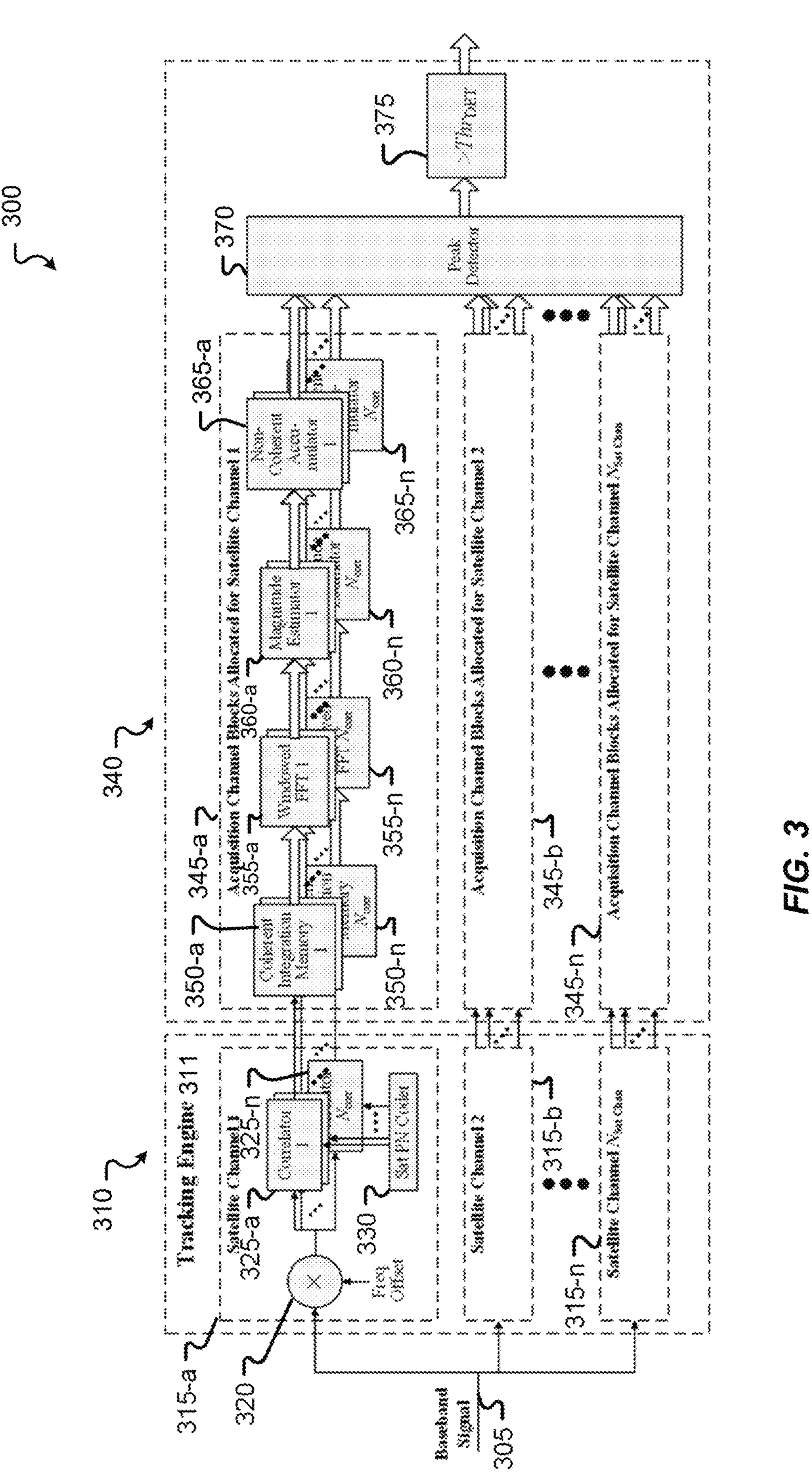
FIG. 3 is a block diagram of a fast acquisition architecture for a binary phase shift keying (BPSK) GNSS signal in accordance with example aspects of the present disclosure.

FIG. 3 is a block diagram of a fast acquisition architecture 300 in accordance with example aspects of the present disclosure. The fast acquisition architecture 300 supports the search of spread spectrum (SS) binary phase shift carrier (BPSK) GNSS signals in accordance with example aspects of the present disclosure.

According to one or more embodiments of the present disclosure, the fast acquisition architecture 300 may be implemented in a GNSS receiver 201 described herein. The fast acquisition architecture 300 may include acquisition group 310 of the TE satellite channels and the corresponding group of the post-correlation acquisition channels (included in post-correlation acquisition circuitry 340).

In some embodiments, the post-correlation acquisition circuitry 340 may include blocks reused from an AE or implemented in an FPGA or a microprocessor included in the GNSS receiver 201, but is not limited thereto. In an example, the post-correlation acquisition circuitry 340 may be implemented on an ad hoc basis for the acquisition mode, using a portion of an FPGA, and the post-correlation acquisition circuitry 340 may be dissolved in other receiver modes of the GNSS receiver 201 to free up the memory or FPGA space for other purposes. The fast acquisition architecture 300 supports the acquisition of GNSS and/or RNSS signals in the input signal 305 of the GNSS receiver 201.

With reference in addition to FIGS. 2 and 3, the GNSS receiver 201 at tracking engine 311 may receive the input signal 305 (e.g., received by the antenna and front end 204), correlate the input signal 305 (e.g., over a pre-determined total integration time 230 and based on an FFT bin width 220) with reference PN codes generated in multiple time positions, and output the correlation results for the time positions.

The post-correlation acquisition circuitry 340 may receive the correlation results from the correlators 325 in the form of time-domain correlation outputs for each PN code and time position. The time interval $T_{CI}=N_{CI}\cdot T_{corr}$ is called coherent integration time interval. Here, $T_{corr}$ is the correlation time for each correlation output. In an example, for each PN code time position, the post-correlation acquisition channel circuitry 340 (e.g., at FFT blocks) may compute a windowed FFT of the input signal 305.

The group 310 of TE channels may contain satellite channel 315-*a* (also referred to herein as satellite channel 1) through satellite channel 315-*n* (also referred to herein as satellite channel $N_{Sat\ Chan}$). In some embodiments, each satellite channel 315 (e.g., satellite channel 315-*a*), may include a multiplier 320 configured to apply a frequency offset to input signal 305. For example, multiplier 320 may perform frequency correction of the input signal 305. It is to be understood that the designator “n” can be any suitable integer value. It is to be understood that the quantity “n” referring to one element (e.g., satellite channel 315-*n*) may be equal to or different from the quantity “n” referring to another element (e.g., correlator 325-*n*).

The group 310 may include a plurality of correlators 325 (tracking engine correlators). In some embodiments, for each satellite channel 315 (e.g., satellite channel 315-*a*), the group 310 may include a set of correlators 325 (also referred to herein as a bank of correlators 325 or a correlator bank). For example, for satellite channel 315-*a*, the group 310 may include correlator 325-*a* (also referred to herein as correlator 1) through correlator 325-*n* (also referred to herein as correlator $N_{corr}$). In an example, the correlators 325 associated with a given satellite channel 315 (e.g., satellite channel 315-*a*) are configured to search for and acquire a GNSS satellite signal associated with a target satellite.

The group 310 may include a satellite PN coder 330. In some other embodiments, for each satellite channel 315, the group 310 may include a respective satellite PN coder 330. The satellite PN coder 330 may provide one or more PN codes to each of the correlators 325, based on which the correlators 325 may search for and acquire a signal. For example, the GNSS receiver 201 may associate each satellite channel 315 with a PN code.

It is to be understood that the groups of TE channels described herein (e.g., group 310, group 410, and the like) are not limited to the elements illustrated in the tracking engines. These groups may include other elements and circuitry (not illustrated) supportive of other features. For example, the groups may include other features as described with reference to the TE satellite channel 500 later described herein.

According to one or more embodiments of the present disclosure, the GNSS receiver 201 may include a sets of post-correlation acquisition channel blocks 345, in which each set of post-correlation acquisition channel blocks 345 is allocated for a given satellite channel 315. For example, the GNSS receiver 201 may include post-correlation acquisition channel blocks 345-*a* (allocated for satellite channel 315-*a*) through post-correlation acquisition channel blocks 345-*n* (allocated for satellite channel 315-*n*).

In an example embodiment, the post-correlation acquisition channel blocks 345 (and included components of the post-correlation acquisition channel blocks 345) are implemented in one or more portions of post-correlation acquisition circuitry 340. The GNSS receiver 201 may configure and reconfigure the one or more portions of the post-correlation acquisition circuitry 340 for multiple purposes. For example, the GNSS receiver 201 may configure portions of the post-correlation acquisition circuitry 340 for performing frequency analysis (e.g., in accordance with an acquisition mode described herein), and the GNSS receiver 201 may configure the same portions of the post-correlation acquisition circuitry 340 for other purposes (e.g., in accordance with a non-acquisition mode described herein).

In some embodiments, each set of post-correlation acquisition channel blocks 345 (e.g., post-correlation acquisition channel blocks 345-*a*) may include CI memory blocks 350 (also referred to herein as pre-FFT coherent integration memory blocks), windowed FFT blocks 355, magnitude estimator blocks 360, and NCI accumulator blocks 365. The CI memory blocks 350 may store $N_{CI}$ subsequent time-domain correlation outputs from correlators 325 for each PN code and time position. The time interval $T_{CI}=N_{CI}\cdot T_{corr}$ is called coherent integration time interval. The windowed FFT blocks 355 may perform $N_{FFT}$-point windowed FFT. Here, $N_{FFT}\geq N_{CI}$, with the FFT blocks 355 performing zero-padding if $N_{FFT}>N_{CI}$. The complex outputs of FFT blocks 355 correspond to $N_{FFT}$ frequency bins. A plurality of $N_{bins}$ of those outputs (corresponding to the central group of the whole set of the frequency bins, $N_{bins}\leq N_{FFT}$) may be used for frequency-domain search of the GNSS signals. The magnitude estimator blocks 360 may calculate the magnitudes of the $N_{bins}$ complex FFT outputs, and the NCI accumulator blocks 365 may accumulate (i.e. sum) $N_{NCI}$ subsequent outputs from each magnitude estimator block 360.

In some embodiments, the GNSS receiver 201 may include a peak detector block 370 that compares the post-integration output magnitudes of all utilized frequency bins from all correlators in all utilized satellite channels and detects the output with the largest magnitude (the most likely output to correspond to the delay and frequency of the searched signal). In some examples, the peak detector block 370 may include a plurality of peak detection blocks (not illustrated), and each of the peak detection blocks may be connected to a separate set of TE channels searching for the same GNSS satellite signal. The peak detector block 370 may generate an output indicative of the detected peak and the corresponding timing and frequency information (i.e. the peak's position on the time-frequency plane).

The term “connected to” may refer to a physical and/or electrical coupling between components. In some other cases, the term “connected to” may refer to a wireless coupling between components.

In the acquisition mode of the GNSS receiver 201, each set of post-correlation acquisition channel blocks 345 (e.g., post-correlation acquisition channel blocks 345-*a*) associated with a given satellite channel is connected to the outputs of the correlators 325 associated with the same channel, and the correlators 325 are configured to search for several GNSS satellite signals at the same time. For example, post-correlation acquisition channel blocks 345-*a* and correlators 325 illustrated in the example of FIG. 3 are associated with satellite channel 315-*a*, and post-correlation acquisition channel blocks 345-*a* are connected to outputs of correlators 325. In an example, the post-correlation acquisition channel blocks 345-*a* (e.g., coherent integration memory block 350-*a*, windowed FFT block 355-*a*, magnitude estimation block 360-*a*, and NCI accumulator block

365-*a*) associated with a given satellite channel 315-*a* may perform frequency analysis of the correlator outputs provided by correlators 325 associated with the same satellite channel 315-*a*.

In the acquisition mode of the GNSS receiver 201, the peak detection blocks included in the peak detector block 370 are respectively connected to the outputs of the post-correlation acquisition channel blocks 345. For example, each of the peak detection blocks may be connected to an output of a corresponding NCI accumulator block 365. In an example, each set of post-correlation acquisition channel blocks 345 is assigned to search for a single satellite signal.

Each peak detector block 370 is followed by the comparator block 375 comparing the detected peak value to the signal detection threshold $Thr_{DET}$. If the detected peak exceeds the threshold, signal detection is declared, In a non-acquisition mode, the post-correlation acquisition channel blocks 345 and peak detection blocks are deactivated. For example, the post-correlation acquisition channel blocks 345 and the peak detector block 370 may be in a deactivated or inactive state. In some cases, in the non-acquisition mode, the GNSS receiver 201 may reconfigure portions of the post-correlation acquisition circuitry 340 which were used for the acquisition mode (e.g., portions of the post-correlation acquisition circuitry 340 which provided functionality of the post-correlation acquisition channel blocks 345 and peak detector block 370) for other purposes.

Figure 4:
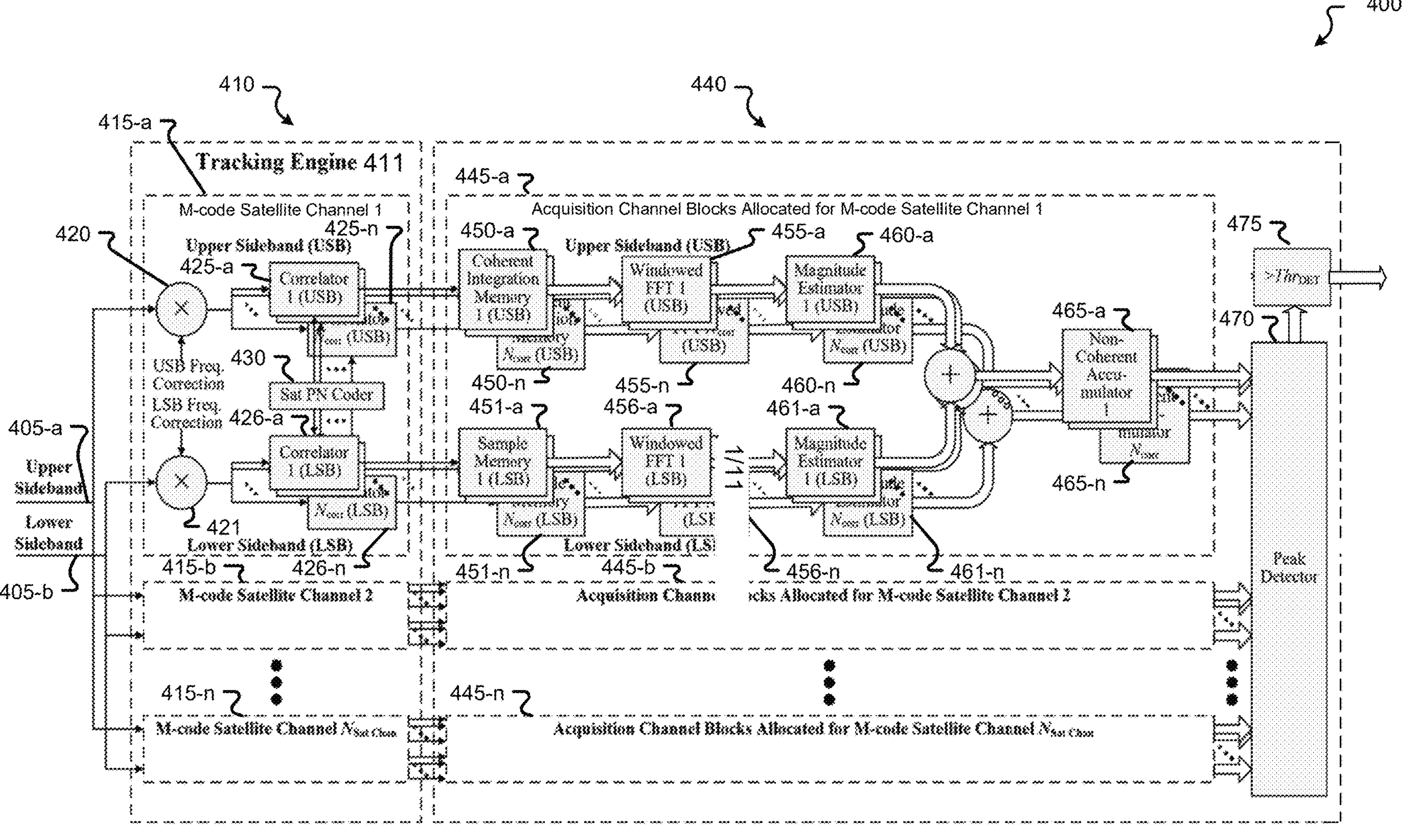
FIG. 4 is a block diagram of a fast acquisition architecture for wideband binary offset carrier (BOC) GNSS signals in accordance with example aspects of the present disclosure.

FIG. 4 is a block diagram of a fast acquisition architecture 400 in accordance with example aspects of the present disclosure. The fast acquisition architecture 400 supports the acquisition of wideband binary offset carrier (BOC) spread spectrum (SS) GNSS signals in accordance with example aspects of the present disclosure.

The fast acquisition architecture 400 may be implemented at a GNSS receiver 201 described herein. The fast acquisition architecture 400 includes acquisition group 410 of TE channels and processing circuitry 440. The fast acquisition architecture 400 supports the acquisition of GNSS and/or RNSS signals in the input signal 405 (e.g., input signal 405-*a* (an upper sideband (USB) signal), input signal 405-*b* (a lower sideband (LSB) signal) at the GNSS receiver 201. The fast acquisition architecture 400 includes aspects of fast acquisition architecture 300, and repeated descriptions of like elements are omitted for brevity. In some aspects, the input signals 405 may include one or more GNSS signals or one or more RNSS signals. In some cases, the processing circuitry 440 may include blocks reused from an AE or implemented in an FPGA, a microprocessor, or the like.

The tracking engine 411 may be configured for tracking multiple satellite channels 415. For example, the tracking engine 411 may support tracking of satellite channel 415-*a* (also referred to herein as M-code satellite channel 1) through satellite channel 415-*n* (also referred to herein as satellite channel $N_{Sat\ Chan}$). In some embodiments, for each satellite channel 415 (e.g., satellite channel 415-*a*), the input signal 405 may include a complex multiplier 420 configured to apply a frequency offset to input signal 405-*a* (e.g., USB signal) and a complex multiplier 421 configured to apply a frequency offset to input signal 405-*b* (e.g., LSB signal). For example, complex multiplier 420 and complex multiplier 421 may respectively perform frequency correction to input signal 405-*a* and input signal 405-*b*.

The group 410 may include a satellite PN coder 430. In some embodiments, for each satellite channel 415 (e.g., satellite channel 415-*a*), the tracking engine 311 may include a plurality of correlators 425 associated with the USB, a plurality of correlators 426 associated with the LSB, and a satellite PN coder 430.

The GNSS receiver 201 may include a plurality of post-correlation acquisition channel blocks 445, such that each of the post-correlation acquisition channel blocks 445 is allocated for a given TE satellite channel 415. For example, the GNSS receiver 201 may include post-correlation acquisition channel blocks 445-*a* (allocated for satellite channel 415-*a*) through post-correlation acquisition channel blocks 445-*n* (allocated for satellite channel 415-*n*).

In an example embodiment, the GNSS receiver 201 may configure and reconfigure one or more portions of the processing circuitry 440 for multiple purposes. For example, the GNSS receiver 201 may configure portions of the processing circuitry 440 for performing frequency analysis (e.g., in accordance with an acquisition mode described herein), and the GNSS receiver 201 may configure the same portions of the processing circuitry 440 for other purposes (e.g., in accordance with a non-acquisition mode described herein).

In some embodiments, each set of post-correlation acquisition channel blocks 445 (e.g., post-correlation acquisition channel blocks 445-*a*) may include coherent integration memory blocks 450, windowed FFT blocks 455, and magnitude estimation blocks 460 associated with the USB and acquisition of the input signal 405-*a*. In some embodiments, each set of post-correlation acquisition channel blocks 445 may include coherent integration memory blocks 451, windowed FFT blocks 456, and magnitude estimation blocks 466 associated with the LSB and acquisition of the input signal 405-*b*. Each set of post-correlation acquisition channel blocks 445 may include NCI accumulator blocks 465.

In some embodiments, the GNSS receiver 201 may include a peak detector block 470. In some examples, the peak detector block 470 may include a plurality of peak detection blocks (not illustrated), and each of the peak detection blocks may be connected to a separate set of TE channels searching for the same GNSS satellite signal. The peak detector block 470 may generate an output indicative of the detected peak and the corresponding timing and frequency information (i.e. the peak's position on the time-frequency plane).

Each peak detector block 470 is followed by the comparator block 475 comparing the detected peak value to the signal detection threshold $Thr_{DET}$. If the detected peak exceeds the threshold, signal detection is declared.

The fast acquisition architecture 400 of the GNSS receiver 201 may support an acquisition mode and a non-acquisition mode as described with reference to fast acquisition architecture 300 of FIG. 3, and repeated descriptions of like elements are omitted for brevity.

As described herein, the systems and techniques described herein include configuring a first group of TE tracking channels for GNSS satellite search (e.g., as illustrated in FIGS. 3 and 4), and further, configuring a second group of TE tracking channels for validation and tracking of detected GNSS signals.

Figure 5:
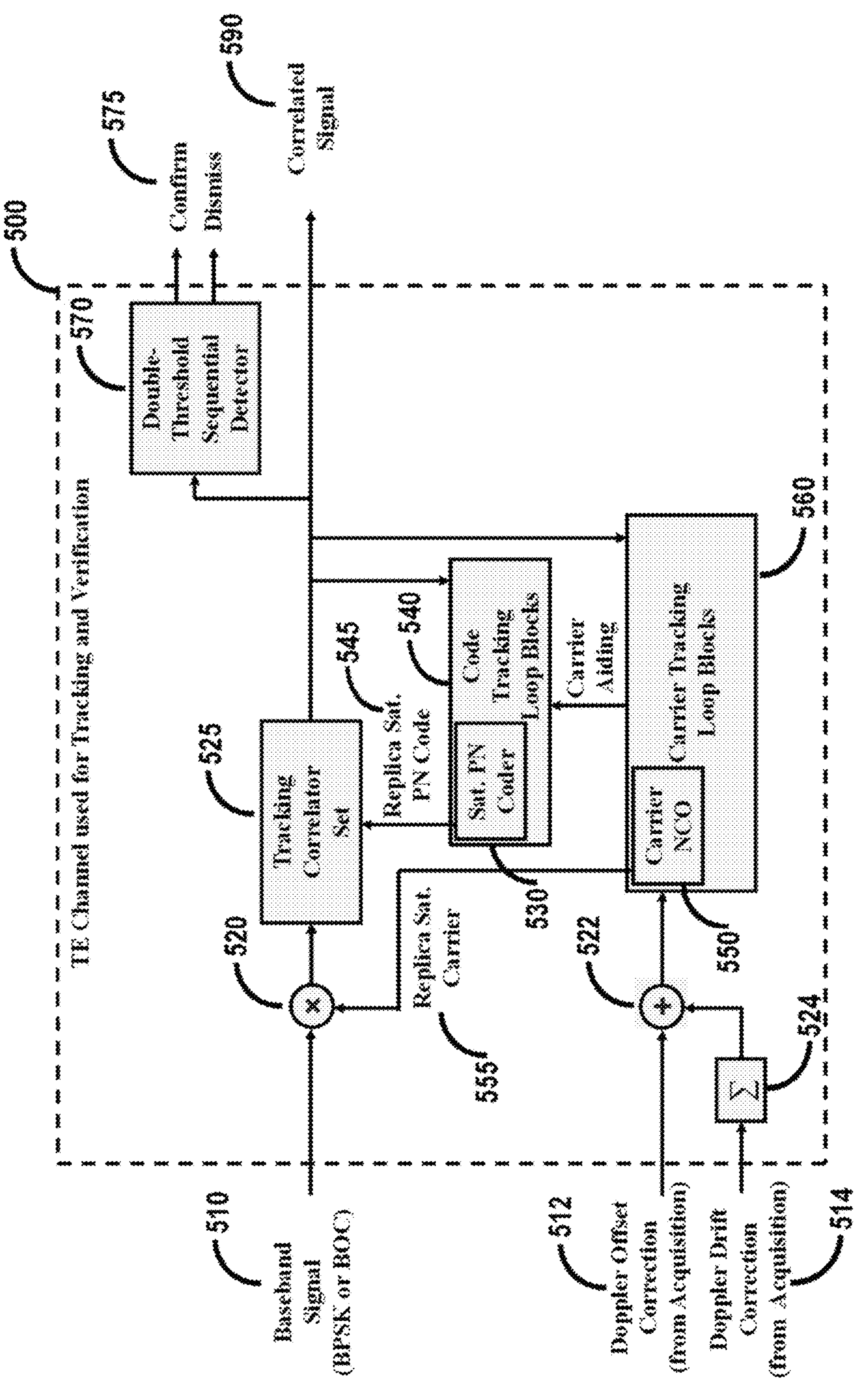
FIG. 5 is a block diagram of a tracking channel used for validation and tracking of a detected GNSS signal in accordance with example aspects of the present disclosure.

FIG. 5 is a block diagram of a TE satellite channel 500 in full configuration that supports pull-in, tracking, and validation of a detected GNSS signal (BPSK or BOC) in accordance with example aspects of the present disclosure. The TE satellite channel 500 includes aspects of satellite channel 315 and satellite channel 415 described herein, and repeated descriptions of like elements are omitted for brevity.

In the example illustrated at FIG. 5, TE satellite channel 500 is in a tracking configuration in accordance with example aspects of the present disclosure. In contrast, in the examples illustrated at FIGS. 3 and 4 regarding satellite channel 315 and satellite channel 415, the TE channel blocks used for signal search and acquisition (e.g., from among available TE channel blocks) are illustrated. Correlator set 525 for BPSK signals is shown in more detail in FIG. 3 as correlators 325 (e.g., correlator 325-*a* through correlator 325-*n*) (also referred to herein as a correlator set), and correlator set 525 for wideband BOC signals is shown in more detail in FIG. 4 as USB correlator set of correlators 425 (e.g., correlator 425-*a* through 425-*n*) and LSB correlator set of correlators 426 (e.g., correlator 426-*a* through correlator 426-*n*). Satellite PN coder 530 corresponds to satellite PN coder 330 and satellite PN coder 430 described with reference to FIGS. 3 and 4, respectively.

In the example illustrated at FIG. 5, the PN coder 530 is one of the code tracking loop blocks 540 in FIG. 5. In contrast, for example, the remaining blocks among code tracking loop blocks 540 are disabled in the search and acquisition mode configurations described with reference to FIGS. 3 and 4. In the example tracking configuration shown in FIG. 5, the code tracking loop is fully enabled in association with supporting pull-in, tracking, and validation of the acquired GNSS signal. The full code loop includes the correlator set 525 and other blocks 540 (including the PN coder 530). The full code loop may receive carrier aiding from the carrier tracking loop described below.

In accordance with example aspects of the present disclosure, the satellite channel 500 in tracking configuration may include the carrier tracking loop including the correlator set 525, other carrier tracking loop blocks 560, and complex multiplier 520 (which corresponds to complex multiplier 320 in FIG. 3 and complex multipliers 420 and 421 in FIG. 4). In some embodiments, the carrier tracking loop may include a frequency-locked loop (FLL) alone or combined with a phase-locked loop (PLL). The carrier tracking loop may estimate the signal frequency error (caused by the Doppler offset) and, in some cases, phase error. The carrier tracking loop may drive the carrier Numerically Controlled Oscillator (NCO) 550 that generates the corresponding digital complex sinewave 555, which is sent (e.g., electronically transmitted over a wired connection) to the complex multiplier 520. Multiplication of the baseband digital complex input signal 510 by sinewave 555 removes the frequency error and, in some cases, phase error from signal 510. Since the input signal's Doppler offset may exceed the carrier loop pull-in range, a Doppler offset correction signal 512 (also known as Doppler aiding) can be applied to the carrier NCO 550. Aspects of the TE satellite channel 500 support accommodating high Doppler drift, by integrating an estimated Doppler drift correction signal 514 (also known as Doppler drift aiding) in the continuously running Doppler drift accumulator 524 and adding the sum to 512 in the adder 522 before applying to the carrier NCO 550.

Figure 6:
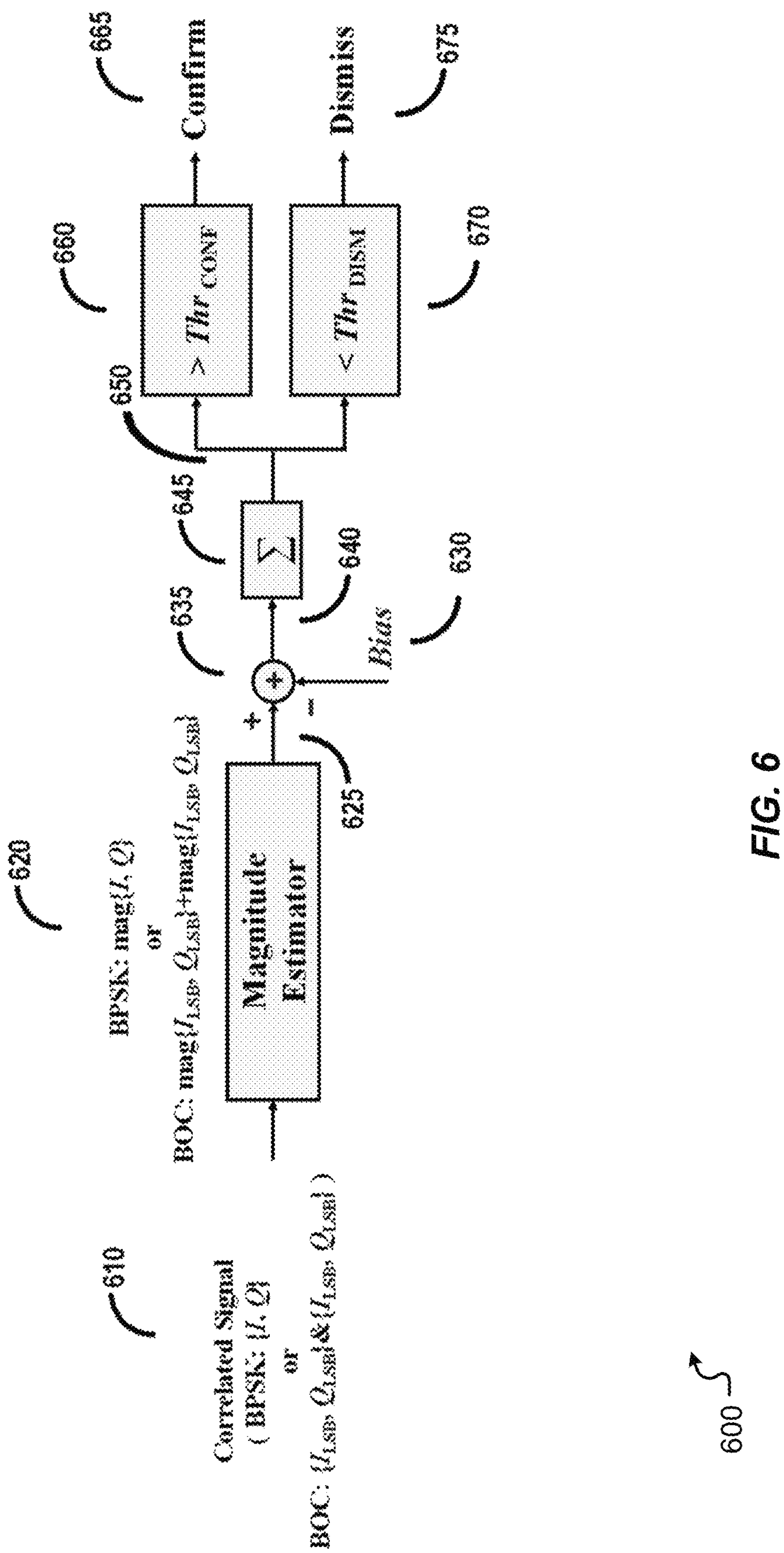
FIG. 6 is a block diagram of a sequential detector used in a tracking channel for validation of a detected GNSS signal in accordance with example aspects of the present disclosure.

In addition to the blocks described above, tracking channel 500 may include the double-threshold sequential detector 570 used for validation of the correlator output signal 590 in the tracking mode, example aspects of which are shown in more detail in FIG. 6.

FIG. 6 shows a block diagram of double-threshold sequential detector 600. The double-threshold sequential detector 600 may be implemented by aspects of 570 double-threshold sequential detector 570 illustrated at FIG. 5. The sequential detector 600 is capable of performing validation of a correlator's output signal 610 in tracking mode. The magnitude of 625 of the complex signals 610 is estimated in the magnitude estimator block 620. In an example, after subtracting a constant Bias 630 from 625 at the subtracting block 635, the result 640 is integrated in the accumulator 645. The continuous output 650 of 645 is fed into two comparators. At comparator 660, the output 650 may be continuously compared to the positive threshold value $Thr_{CONF}$, and in response to determining at the comparator 660 that the output 650 exceeds positive threshold value $Thr_{CONF}$, the presumed GNSS signal is declared to be present in the output 650, and a flag "confirmed" is provided at the output 665 of comparator 660.

At comparator 670, the output 650 may be continuously compared to the negative threshold value $Thr_{DISM}$ (where $Thr_{DISM}<Thr_{CONF}$), and in response to determining at the comparator 670 that the output 650 falls below the negative threshold value $Thr_{DISM}$, the presumed GNSS signal is declared to be absent in the output 650, and a flag "dismissed" is provided at the output 675 of the comparator 670. In some embodiments, for practical purposes, a threshold integration time in accumulator 645 may be set to a duration $T_{SEQ\ DET}$. If by the end of the integration time the output 650 has not yet crossed either threshold, the double-threshold sequential detector 600 may provide an output flag "dismissed" with respect to the output 650.

In embodiments, aspects of the present disclosure include calculating the parameter values (e.g., Bias, $Thr_{CONF}$, and $Thr_{DISM}$) of sequential detector 600 based on the intended probabilities of detection $P_{DET\ SEQ}$ and false detection $P_{FD\ SEQ}$, for example, using the Equations below.

$$\text{Bias} = 0.5(m_s + m_n) \tag{1}$$

$$Thr_{CONF} = \frac{\sigma_s \sigma_n}{m_s - m_n} \log\left(\frac{P_{DET\ SEQ}}{P_{FD\ SEQ}}\right) \tag{2}$$

$$Thr_{DISM} = \frac{\sigma_s \sigma_n}{m_s - m_n} \log\left(\frac{1 - P_{DET\ SEQ}}{1 - P_{FD\ SEQ}}\right) \tag{3}$$

Here, constants $m_n$ and $\sigma_n$ are the mean and standard deviation, respectively, of the magnitude estimator output 625 when the tracked satellite signal is absent. Constants $m_s$ and $\sigma_s$ are the mean and standard deviation, respectively, of the magnitude estimator output 625 in presence of the tracked satellite signal. In some embodiments, $m_s$ and $\sigma_s$ are calculated for the lowest target $C/N_0$ (e.g., the lowest required $C/N_0$).

Depending on the calculated parameters, the dismissal time for a non-existent signal in double-threshold sequential detector 600 may be shorter than the confirmation time for cases in which a valid signal is present. In some aspects, the confirmation time may depend on the C/No value.

Table in FIG. 7 demonstrates the 2-dimensional timing diagram illustrating an example allocation of the TE channels assigned for signal acquisition. The vertical axis shows the TE channel number, and the horizontal axis shows time. Each row (except the first two) represents one TE channel. As shown in FIGS. 3 and 4, a TE channel contains $N_{corr}$ correlators for a BPSK signal, or $N_{corr}$ correlator pairs (i.e. $N_{corr}$ correlators per sideband) for a wideband BOC signal. The correlators (for BPSK) or correlator pairs (for wideband BOC) process different signal time positions spaced at the intervals $\Delta t_{corr}$.

Each TE channel used for acquisition is followed by the acquisition channel blocks as illustrated in FIGS. 3 and 4. To cover the maximum time uncertainty interval, the timing delay between the neighboring correlators is programmed to be equal to $\Delta t_{corr}$=a $\tau_{chip}$, where $\tau_{chip}$ is the PN code chip duration and a=0.5 . . . 1 depending on the acceptable SNR loss. The maximum time uncertainty interval covered by one TE channel in acquisition mode is equal to $\Delta t_{chan}=N_{corr}\ \Delta t_{corr}$=a $N_{corr}\ \tau_{chip}$.

The total time uncertainty interval $\Delta t_{total}$ is determined by the clock error uncertainty and position uncertainty during acquisition. To minimize the former, a high-stability and/or shock-resistant local oscillator is required. To minimize the latter, high-precision uncertainty propagation should be used. Note that the important consideration here is not the error itself (a known error can be compensated in the receiver) but the error uncertainty because it cannot be compensated.

If $\Delta t_{total}>\Delta t_{chan}$, one TE channel is not sufficient for acquisition of one satellite. In that case, the number of TE channels that should be allocated for acquisition of one satellite is N=ceil ($\Delta t_{total}/\Delta t_{chan}$). Therefore, the maximum number of satellites searched in parallel is $N_{Sat\ Search}$=floor ($\Delta t_{total}/\Delta t_{chan}$). In accordance with this description, in FIG. 7 the rows (representing TE channels) are shown in groups of N, with each group searching for one satellite. The total number of groups is $N_{Sat\ Search}$, and the total number of rows is $N_{Sat\ Chan}=N_{Sat\ Search}$ N.

Each column (except the first two) represents one parallel search interval during which one total (coherent and possibly non-coherent) integration is performed for each correlator in each TE channel used for acquisition. By way of example, FIG. 7 shows a three-second acquisition process, with the first two seconds allocated for search and the third second for completing the validation of the detected signals. The total integration time T for each search in FIG. 7 is assumed to be one second. Therefore, the total number of satellite searches that can be conducted within the allocated time (two seconds) is 2 $N_{Sat\ Search}$. If the total number of visible satellites that can be searched is equal to or larger than 2 $N_{Sat\ Search}$, every search can be dedicated to a different satellite. Otherwise, several searches should be for the same satellite (e.g., one search during the $1^{st}$ second and another during the $2^{nd}$ second).

The total frequency uncertainty interval $\Delta f_{total}$ is determined by the uncertainties of the clock drift as well as the platform dynamics (typically, velocity and acceleration uncertainties leading to Doppler and Doppler drift uncertainties, respectively). To minimize the clock drift uncertainty, a high-stability and/or shock-resistant local oscillator is required. To minimize the dynamics uncertainties, high-precision uncertainty propagation can be used.

The proper FFT frequency range $\Delta f_{FFT}=1/T_{corr}$ should exceed the total frequency uncertainty interval $\Delta f_{total}$. The proper FFT frequency bin spacing $\Delta f_{FFT\ bin}=\Delta f_{FFT}/N_{FFT}=1/(N_{FFT}\ T_{corr})$ should be less or equal to an initial pull-in range of the FLL $\Delta f_{FLL}$ of the tracking channel to which the detected signal is subsequently assigned. These relations help select the appropriate values of $N_{FFT}$, $N_{CI}$, $T_{corr}$, and $T_{CI}$. Increasing $N_{FFT}$ and/or decreasing $T_{CI}$ may be beneficial for performance but may require throughput increase. It is important to keep the required throughput within proper limits. Another relation is $T=N_{NCI}\ T_{CI}$, where the integer $N_{NCI}$ is the number of non-coherent accumulations performed in the non-coherent accumulator blocks 365*a-n* in FIG. 3 and non-coherent accumulator blocks 465*a-n* in FIG. 4. Setting $N_{NCI}>1$ leads to non-coherent integration loss but may be beneficial for other reasons.

Maximum uncompensated frequency drift $\delta f_{max}$ over the integration time T monotonically increases with T as well as with the Doppler drift uncertainty. To keep the post-integration signal energy in one FFT frequency bin, $\delta f_{max}$ should satisfy the inequality $|\delta f_{max}|\le\Delta f_{FFT\ bin}/2$. Often, $\delta f_{max}$ is defined with respect to a confidence interval.

For each satellite search, the signal detection probability $P_{DET}$ and false detection probability $P_{FD}$ depend on the post-integration SNR and detection threshold value $Thr_{DET}$ in comparator blocks 375 in FIG. 3 and comparator blocks 475 in FIG. 4. The post-integration SNR value, in turn, is determined by the $C/N_0$ value, total integration time T, $N_{NCI}$, and implementation losses.

The main performance characteristics of GNSS signal acquisition include the maximum time to first fix (TTFF) $T_{TTFF\ max}$ (equal to 3 seconds in FIG. 7 example), minimum carrier-to-noise ratio $(C/N_0)_{min}$, and first fix probability $P_{FF}$. These characteristics are interdependent.

Selecting $Thr_{DET}$ for the acquisition channels requires setting the proper values of $P_{DET}$ and $P_{FD}$. The value of $P_{DET}$ can be determined based on $P_{FF}$ as well as the aforementioned total number of satellite searches $N_{Sat\ Search}$ and the minimum number of satellites $N_{Sat\ Min}$ that should be acquired in order to significantly reduce the uncertainties for subsequent satellite searches. As mentioned above, with high dynamics uncertainties, such reduction may necessitate acquiring four satellites. This translates to $N_{Sat\ Min}\ge4$ (sign "≥" instead of "=" is due to the possibility of false detection of one or more satellites). Once $P_{FF}$, $N_{Sat\ Search}$, and $N_{Sat\ Min}$ are known, the required $P_{DET}$ can be calculated, for example, based on a conservative assumption that all searched satellite signals satisfy one or more criteria (e.g., all searched satellite signals have the same carrier-to-noise ratio equal to $(C/N_0)_{min}$). In such a case, the probability distribution of the number of detected satellites can be approximately considered binomial, especially if $N_{Sat\ Search}>>N_{Sat\ Min}$, and the approximate equation relating $P_{FF}$ and $P_{DET}$ is below.

$$P_{FF}=\sum_{n=N_{Sat\ Min}}^{N_{Sat\ Search}}\binom{N_{Sat\ Search}}{n}P_{DET}^{n}(1-P_{DET})^{N_{Sat\ Search}-n} \tag{4}$$

The value of $P_{FD}$ corresponding to a given $P_{DET}$ depends on the product $T_{CI}(C/N_0)_{min}$ and $N_{NCI}$. It can be found from equations or curves provided in, for example, in "Guide to Basic Pulse-Radar Maximum-Range Calculation," Part 1, NRL Report 6930, 1969 by L. V. Blake.

In most applications it is beneficial to use long integration approach: selecting longer T to detect signals with low $(C/N_0)_{min}$. This allows achieving high $P_{DET}$ With low $P_{FD}$ at the signal detection stage, therefore attaining high $P_{FF}$. The parallel search example in FIG. 7 is an illustration of long integration approach.

However, in cases of high Doppler drift uncertainty combined with clock drift uncertainty, the maximum uncompensated frequency drift $\delta f_{max}$ during search may exceed the FFT bin width $\Delta f_{FFT}$ bin as illustrated, for example, in FIG. 1. In that case, as mentioned above, the uncompensated frequency drift may move the signal over several frequency bins 115 during the search for and attempted acquisition of the signal, reducing the signal-to-noise ratio (SNR) in each bin 115 and increasing the frequency error. Since increasing T increases $\delta f_{max}$ in some high-dynamics scenarios with high Doppler drift uncertainty, the long integration approach based on increasing T may potentially worsen the acquisition performance rather than improve the acquisition performance.

Table in FIG. 8 demonstrates the 2-dimensional timing diagram showing another example of allocating the TE channels assigned for signal acquisition. This allocation illustrates the short integration approach with T being much shorter (by an integer factor M) than in FIG. 7. Shorter T generally reduces the post-integration SNR, which is a disadvantage. However, in some high-dynamics scenarios with high Doppler drift uncertainty it is compensated by the following advantages. First, it reduces $\delta f_{max}$ increasing the probability that the signal energy is concentrated in one FFT bin. Second, it increases the total number of satellite searches $N_{Sat\ Search}$ by factor M. Therefore, in some embodiments, lower probability of detection $P_{DET}$ in each search is sufficient to ensure the same probability of first fix $P_{FF}$.

In some embodiments, the short integration approach allows for detecting the signals with the resulting frequency estimate being sufficiently accurate to fit within the FLL pull-in range even in scenarios with high Doppler drift uncertainty. Therefore, the detected signal can be handed off to a TE satellite channel working in the tracking mode for validation and tracking.

The detection threshold $Thr_{DET}$ at this stage is based on $P_{DET}$; however, it also controls the probability of false detection in each search $P_{FD}$. Therefore, in case of low post-integration SNR, $P_{FD}$ may become excessively high. To avoid the reduction of $P_{FF}$ due to the inclusion of falsely detected satellites in the navigation solution, the falsely detected satellites must be dismissed at the subsequent validation stage in the TE channels shown in FIG. 5. Since the sequential detector 570 has different thresholds $Thr_{DISM}$ and $Thr_{CONF}$ for dismissal and confirmation, respectively, these thresholds should be set to ensure sufficiently low probability of false detection $P_{FD\ SEQ}$ after dismissal. Therefore, whereas the desired probability of detection is more important at the detection stage, the desired probability of false detection is important at the validation stage.

Figure 9:
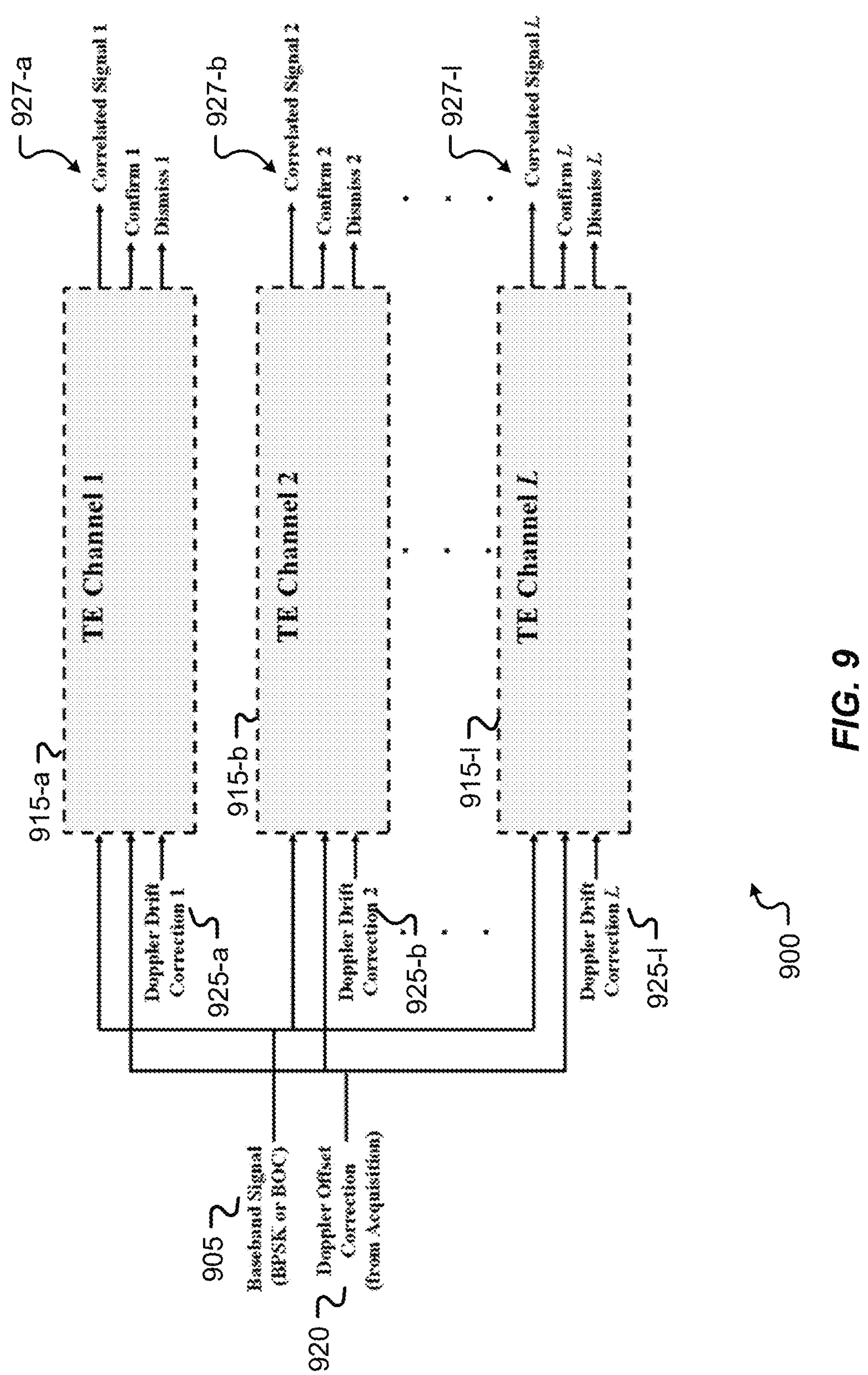
FIG. 9 is a block diagram of a set of tracking channels used for initial validation of a detected GNSS signal with large residual acceleration uncertainty in accordance with example aspects of the present disclosure.

The short integration approach described above allows detecting the signals with the resulting frequency estimate being sufficiently accurate to fit within the FLL pull-in range even in scenarios with high Doppler drift uncertainty. However, in such scenarios the pull-in is still not assured if the unaccounted Doppler drift uncertainty exceeds the dynamic stress threshold of the FLL. FIG. 9 shows an arrangement 900 of TE channels that allows validation of a detected satellite signal even in such scenarios. In this arrangement, the detected signal is initially handed off not to one but to L parallel tracking channels 915. These channels are identically initialized for tracking the detected signal, with the exception of Doppler drift aiding values sent to the inputs 925. The Doppler drift aiding values $f'_{drift\ 1}$, $f'_{drift\ 2}$, . . . , $f'_{drift\ L}$ are selected to cover the whole Doppler drift uncertainty range, with the intervals between them being smaller than the dynamic stress threshold of the FLL. Such an arrangement ensures that if the signal is detected correctly, at least one of the channels will be able to start tracking it and validate it by producing the confirmation signal of the sequential detector. After the validation, only that channel can be used for tracking the signal. Other TE channels can be reused for other purposes, which may include tracking and validation of other detected signals.

FIG. 10 includes example plots illustrating results of uncertainty propagation for position, velocity, and acceleration with respect to time. Plot 1010 illustrates two cases of propagating the standard deviation (std) of position uncertainty based on a given error budget. Curve 1011 is derived using the platform's equations of motion. Curve 1012 is derived using the same error budget, the equations of motion, and the data from an inertial measurement device (in this example, a longitudinal accelerometer). In a similar fashion, plot 1040 illustrates the propagation of velocity uncertainty for the same platform based only on the error budget and equations of motion (1041) and on the error budget, equations of motion, and the accelerometer data (1042). Plot 1070 illustrates the propagation of acceleration uncertainty for the same platform, without (1071) and with (1072) the longitudinal accelerometer data. According to one or more embodiments of the present disclosure, the systems and techniques described herein support configuring the GNSS receiver 201 (e.g., configuring FFT bin width 220, coherent integration time 225, total integration time 230, total quantity 235, total quantity 240, architecture configuration 245, and the like) based on the data included in the example plots.

FIG. 11 illustrates an example flowchart of a method 1100 in accordance with one or more embodiments of the present disclosure. The method 1100 may be implemented by the example aspects of a GNSS receiver 201 described herein.

At 1105, the method 1100 includes configuring, by processing circuitry of an electronic device, a device architecture of the electronic device.

In some aspects, configuring the device architecture includes, in association with a first mode of the electronic device: (at 1110) dividing a plurality of TE channels included in a tracking engine (TE) of the device architecture into a first group of TE channels and a second group of TE channels; (at 1115) configuring the first group of TE channels to search for and detect a plurality of signals in parallel, search for and detect the plurality of signals according to a sequential order, or both; and (at 1120) configuring the second group of TE channels to validate and track the detected plurality of signals.

In some aspects, configuring the device architecture includes, in association with a second mode of the electronic device: (at 1125) configuring the first group of TE channels and the second group of TE channels to track the detected plurality of signals.

In some aspects, configuring the device architecture further includes, by the processing circuitry: in the first mode of the electronic device: coupling a plurality of post-correlation acquisition channels of the electronic device to the first group of TE channels; and configuring the plurality of post-correlation acquisition channels to perform frequency analysis of output signals generated by a plurality of correlators in the first group of TE channels.

In some aspects, configuring the device architecture further includes, by the processing circuitry: in the first mode of the electronic device: coupling a plurality of peak detection blocks included in a peak detection circuit of the electronic device to the plurality of post-correlation acquisition channels; and configuring the plurality of peak detection blocks to detect peaks of output signals generated by one or more post-correlation acquisition channels of the plurality of post-correlation acquisition channels, where configuring the plurality of peak detection blocks includes coupling each peak detector block to a comparator configured to compare peak value detected by the peak detector block with a detection threshold.

In some aspects, configuring the device architecture further includes, by the processing circuitry: in the second mode of the electronic device: deactivating the plurality of post-correlation acquisition channels; or configuring the plurality of post-correlation acquisition channels for one or more functions different from performing the frequency analysis.

In some aspects, configuring the device architecture further includes, by the processing circuitry: determining one or more time-domain uncertainties, one or more frequency-domain uncertainties, or both associated with at least one of: clock bias associated with the electronic device; clock drift associated with the electronic device; position of the electronic device; velocity associated with the electronic device; and acceleration associated with the electronic device; and configuring, based on the one or more time-domain uncertainties, the one or more frequency-domain uncertainties, or both, at least one of: one or more time intervals associated with searching for and acquiring the plurality of signals; one or more frequency ranges associated with searching for and acquiring the plurality of signals; and a quantity of different signals to search for in parallel from among the plurality of signals.

In some aspects, configuring the device architecture further includes, by the processing circuitry: in the first mode of the electronic device: determining a set of uncertainties associated with searching for and acquiring the plurality of signals, where the set of uncertainties includes: position uncertainty associated with the electronic device; velocity uncertainty associated with the electronic device; and acceleration uncertainty associated with the electronic device; and maintaining or updating at least one uncertainty of the set of uncertainties based on processing the set of uncertainties using one or more equations.

In the descriptions of the flowcharts herein, the operations may be performed in a different order than the order shown, or the operations may be performed in different orders or at different times. Certain operations may also be left out of the flowcharts, one or more operations may be repeated, or other operations may be added to the flowcharts.

The term “about” is intended to include the degree of error associated with measurement of the particular quantity based upon the equipment available at the time of filing the application.

All ranges and ratio limits disclosed in the specification and claims may be combined in any manner. The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The corresponding structures, materials, acts and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the technical concepts in the form disclosed. Many modifications and variations will be apparent to those of ordinary skill in the art without departing from the scope and spirit of the disclosure. The embodiments were chosen and described to best explain the principles of the disclosure and the practical application and to enable others of ordinary skill in the art to understand the disclosure for various embodiments with various modifications as are suited to the particular use contemplated.

Terms such as, for example, first, second, and the like may be used to describe various components, but the components should not be limited by the terms. The terms as used herein may distinguish one component from other components and are not to be limited by the terms. For example, without departing the scope of the present disclosure, a first component may be referred to as a second component, and similarly, the second component may also be referred to as the first component. The terms of a singular form may include plural forms unless otherwise specified.

While the various embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. An electronic device comprising:

a device architecture comprising a tracking engine (TE), wherein the TE comprises a plurality of TE channels, each TE channel comprising a plurality of correlators, wherein in a first mode of the electronic device, the electronic device is configured to:

divide the plurality of TE channels into a first group of TE channels and a second group of TE channels;

configure the first group of TE channels to search for and detect a plurality of signals in parallel, search for and detect the plurality of signals according to a sequential order, or both;

determine a set of uncertainties associated with searching for and acquiring the plurality of signals, wherein the set of uncertainties comprises:

position uncertainty associated with the electronic device;

velocity uncertainty associated with the electronic device; and acceleration uncertainty associated with the electronic device; and maintain or update at least one uncertainty of the set of uncertainties based on processing the set of uncertainties using one or more equations; and configure the second group of TE channels to validate and track the detected plurality of signals, wherein in a second mode of the electronic device, the electronic device is configured to configure the first group of TE channels and the second group of TE channels to track the detected plurality of signals, wherein the electronic device is configured to receive direct sequence (DS) spread spectrum (SS) signals.

2. The electronic device of claim 1, further comprising:

a plurality of post-correlation acquisition channels, wherein each post-correlation acquisition channel comprises:

one or more coherent integration memory blocks;

one or more windowed FFT blocks;

one or more magnitude estimation blocks; and one or more non-coherent accumulator blocks; and one or more peak detection blocks, each connected to outputs of one or more post-correlation acquisition channels of the plurality of the post-correlation acquisition channels and coupled to a comparator configured to compare a detected peak value to a detection threshold.

3. The electronic device of claim 1, further comprising:

a plurality of post-correlation acquisition channels, wherein in the first mode of the electronic device:

the electronic device is configured to couple the plurality of post-correlation acquisition channels to the first group of TE channels; and the plurality of post-correlation acquisition channels is configured to perform frequency analysis of output signals generated by a plurality of correlators in the first group of TE channels.

4. The electronic device of claim 3, further comprising:

a peak detection circuit comprising a plurality of peak detection blocks, wherein in the first mode of the electronic device:

the electronic device is configured to couple the plurality of peak detection blocks to the plurality of post-correlation acquisition channels; and the plurality of peak detection blocks is configured to detect peaks of output signals generated by one or more post-correlation acquisition channels of the plurality of post-correlation acquisition channels, wherein each peak detector block is coupled to a comparator configured to compare peak value detected by the peak detector block with a detection threshold.

5. The electronic device of claim 3, wherein in the second mode, the electronic device is configured to:

deactivate the plurality of post-correlation acquisition channels; or configure the plurality of post-correlation acquisition channels for one or more functions different from performing the frequency analysis.

6. The electronic device of claim 3, wherein:

in the first mode, the electronic device is configured to assign a subgroup of TE channels in the second group of TE channels for validation of one detected signal, with a plurality of Doppler drift aiding values, wherein the plurality of Doppler drift aiding values differ from one another and cover a Doppler drift uncertainty interval.

7. The electronic device of claim 1, wherein the electronic device is configured to:

determine one or more time-domain uncertainties, one or more frequency-domain uncertainties, or both associated with at least one of:

clock bias associated with the electronic device;

clock drift associated with the electronic device;

position of the electronic device;

velocity associated with the electronic device; and acceleration associated with the electronic device; and configure, based on the one or more time-domain uncertainties, the one or more frequency-domain uncertainties, or both, at least one of:

one or more time intervals associated with searching for and acquiring the plurality of signals;

one or more frequency ranges associated with searching for and acquiring the plurality of signals; and a quantity of different signals to search for in parallel from among the plurality of signals.

8. The electronic device of claim 1, wherein in the first mode:

a quantity of TE channels in the first group of TE channels is variable; and the electronic device is configured to select the quantity based on a set of criteria comprising:

input carrier-to-noise ratio; and a maximum target time to first fix (TTFF) value.

9. The electronic device of claim 1, further comprising:

one or more inertial measurement devices configured to provide inertial measurement data associated with the electronic device, wherein, in the first mode, the electronic device is configured to maintain or update the at least one uncertainty of the set of uncertainties based on processing the inertial measurement data.

10. The electronic device of claim 1, wherein each TE channel comprises a double-threshold sequential detector comprising a confirmation threshold and a dismissal threshold.

11. The electronic device of claim 1, wherein in the first mode, the electronic device is configured to:

set detection thresholds in post-correlation acquisition channels coupled to at least some TE channels of the first group of TE channels based on a target probability of detection; and set dismissal thresholds in at least some TE channels of the second group of TE channels based on a target probability of false detection.

12. The electronic device of claim 11, wherein in the first mode, the electronic device is configured to set a search time, one or more detection thresholds, and a quantity of searches using:

a short integration approach for cases in which a total frequency drift uncertainty exceeds a threshold uncertainty value, or a long integration approach for cases in which the total frequency drift uncertainty is less than or equal to the threshold uncertainty value.

13. The electronic device of claim 1, wherein the detected plurality of signals comprise one or more Global Navigation Satellite System (GNSS) signals, one or more Regional Navigation Satellite System (RNSS) signals, or both.

14. A method comprising:

configuring, by processing circuitry of an electronic device, a device architecture of the electronic device, wherein configuring the device architecture comprises:

in association with a first mode of the electronic device:

dividing a plurality of TE channels comprised in a tracking engine (TE) of the device architecture into a first group of TE channels and a second group of TE channels;

configuring the first group of TE channels to search for and detect a plurality of signals in parallel, search for and detect the plurality of signals according to a sequential order, or both;

determining a set of uncertainties associated with searching for and acquiring the plurality of signals, wherein the set of uncertainties comprises:

position uncertainty associated with the electronic device;

velocity uncertainty associated with the electronic device; and acceleration uncertainty associated with the electronic device; and maintaining or updating at least one uncertainty of the set of uncertainties based on processing the set of uncertainties using one or more equations; and configuring the second group of TE channels to validate and track the detected plurality of signals; and in association with a second mode of the electronic device:

configuring the first group of TE channels and the second group of TE channels to track the detected plurality of signals.

15. The method of claim 14, wherein configuring the device architecture further comprises, by the processing circuitry:

in the first mode of the electronic device:

coupling a plurality of post-correlation acquisition channels of the electronic device to the first group of TE channels; and configuring the plurality of post-correlation acquisition channels to perform frequency analysis of output signals generated by a plurality of correlators in the first group of TE channels.

16. The method of claim 15, wherein configuring the device architecture further comprises, by the processing circuitry:

in the first mode of the electronic device:

coupling a plurality of peak detection blocks comprised in a peak detection circuit of the electronic device to the plurality of post-correlation acquisition channels; and configuring the plurality of peak detection blocks to detect peaks of output signals generated by one or more post-correlation acquisition channels of the plurality of post-correlation acquisition channels, wherein configuring the plurality of peak detection blocks comprises coupling each peak detector block to a comparator configured to compare peak value detected by the peak detector block with a detection threshold.

17. The method of claim 15, wherein configuring the device architecture further comprises, by the processing circuitry:

in the second mode of the electronic device:

deactivating the plurality of post-correlation acquisition channels; or configuring the plurality of post-correlation acquisition channels for one or more functions different from performing the frequency analysis.

18. The method of claim 14, wherein configuring the device architecture further comprises, by the processing circuitry:

determining one or more time-domain uncertainties, one or more frequency-domain uncertainties, or both associated with at least one of:

clock bias associated with the electronic device;

clock drift associated with the electronic device;

position of the electronic device;

velocity associated with the electronic device; and acceleration associated with the electronic device; and configuring, based on the one or more time-domain uncertainties, the one or more frequency-domain uncertainties, or both, at least one of:

one or more time intervals associated with searching for and acquiring the plurality of signals;

one or more frequency ranges associated with searching for and acquiring the plurality of signals; and a quantity of different signals to search for in parallel from among the plurality of signals.

* * * * *